(12) United States Patent
Schossmann et al.

(10) Patent No.: US 11,698,311 B2
(45) Date of Patent: Jul. 11, 2023

(54) METAMATERIAL BASED TORQUE AND SHAFT ROTATIONAL SPEED SENSOR

(71) Applicant: Infineon Technologies AG, Neubiberg (DE)

(72) Inventors: Alexander Schossmann, Graz (AT);
Alexander Bergmann, Graz (AT);
Franz Michael Darrer, Graz (AT);
Dirk Hammerschmidt, Finkenstein (AT); Christof Michenthaler, Feistritz/Gail (AT)

(73) Assignee: Infineon Technologies AG, Neubiberg (DE)

( * ) Notice: Subject to any disclaimer, the term of this patent is extended or adjusted under 35 U.S.C. 154(b) by 39 days.

(21) Appl. No.: 17/509,724

(22) Filed: Oct. 25, 2021

(65) Prior Publication Data

US 2023/0131760 A1    Apr. 27, 2023

(51) Int. Cl.
*G01L 3/00* (2006.01)
*G01L 3/10* (2006.01)
*G01D 5/48* (2006.01)

(52) U.S. Cl.
CPC . *G01L 3/10* (2013.01); *G01D 5/48* (2013.01)

(58) Field of Classification Search
CPC ........... G01L 3/10; G01D 5/48; G01D 5/2053
See application file for complete search history.

(56) References Cited

U.S. PATENT DOCUMENTS

| | | | |
|---|---|---|---|
| 11,287,338 B2* | 3/2022 | Hammerschmidt | .... G01L 3/105 |
| 11,435,245 B2* | 9/2022 | Hammerschmidt | .... G01L 3/105 |
| 2009/0000357 A1* | 1/2009 | Uusivirta | ............ G01N 11/162 73/54.32 |
| 2014/0249557 A1* | 9/2014 | Koch, Jr. | ............... A61B 34/74 606/170 |
| 2019/0353773 A1* | 11/2019 | Hammerschmidt | ... G01B 15/02 |
| 2020/0352638 A1* | 11/2020 | Batchelor | ............. A61B 18/14 |
| 2021/0102853 A1* | 4/2021 | Hammerschmidt | .... G01L 3/105 |

(Continued)

OTHER PUBLICATIONS

"E-Bike Torque Sensor Technologycomparison", Sensitivus Gauge, Jun. 25, 2021, https://sensitivus.com/products/contactless-torque-sensor-module/e-bike-torque-sensor-technology-comparison/.

(Continued)

*Primary Examiner* — Max H Noori
(74) *Attorney, Agent, or Firm* — Harrity & Harrity, LLP

(57) ABSTRACT

A torque measurement system includes an outer rotational shaft and an inner rotational shaft both configured to rotate about a rotational axis. A rotation of the inner rotational shaft causes a rotation of the outer rotational shaft via a coupling structure. At least one torque applied to the inner rotational shaft is translated into a first torque-dependent angular shift between the shafts. A first metamaterial track is coupled to the outer rotational shaft and configured to co-rotate with the outer rotational shaft. A second metamaterial track is coupled to the inner rotational shaft and configured to co-rotate with the inner rotational shaft. The tracks are configured to convert an electro-magnetic transmit signal into a first electro-magnetic receive signal based on the first torque-dependent angular shift and a receiver is configured to receive the electro-magnetic receive signal and measure the at least one torque based on the electro-magnetic receive signal.

26 Claims, 17 Drawing Sheets

(56) References Cited

U.S. PATENT DOCUMENTS

2021/0131347 A1* 5/2021 Leque .................. F16H 37/022
2022/0412779 A1* 12/2022 Schossmann ............ G01D 5/48
2023/0010984 A1* 1/2023 Hayashi ................ G06F 3/0362

OTHER PUBLICATIONS

Zhao et al. "Voltage-tunable dual-layer terahertz metamaterials." Microsystems & Nanoengineering, Jul. 4, 2016, doi:10.1038/micronano.2016.25.

Fedotov et al. "Sharp dark-mode resonances in planar metamaterials with broken structuralsymmetry." Feb. 1, 2008, https://arxiv.org/pdf/0704.1577.pdf.

Fedotov et al. "Sharp Trapped-Mode Resonances in Planar Metamaterials with a Broken Structural Symmetry." The American Physical Society, Oct. 2, 2007, DOI: 10.1103/PhysRevLett.99.147401.

Lapine et al. "Structural tunability in metamaterials." American Institute of Physics, Aug. 27, 2009, DOI: 10.1063/1.3211920.

Zhao et al. "Integrating microsystems with metamaterials towards metadevices." Microsystems & Nanoengineering, Jan. 28, 2019, https://doi.org/10.1038/s41378-018-0042-1.

* cited by examiner

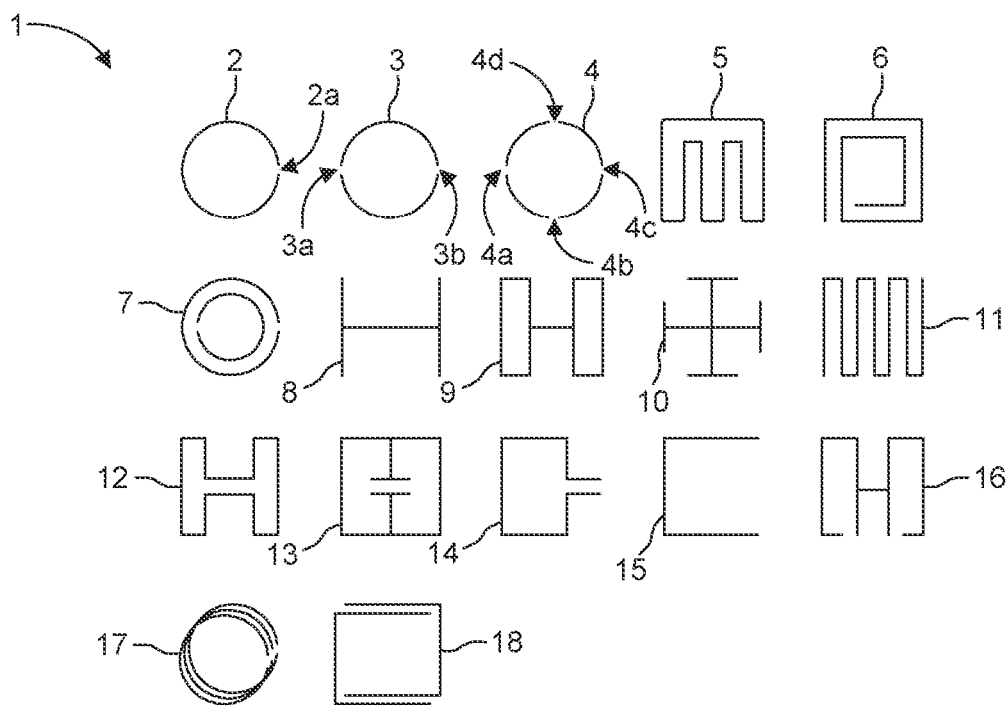
FIG. 1
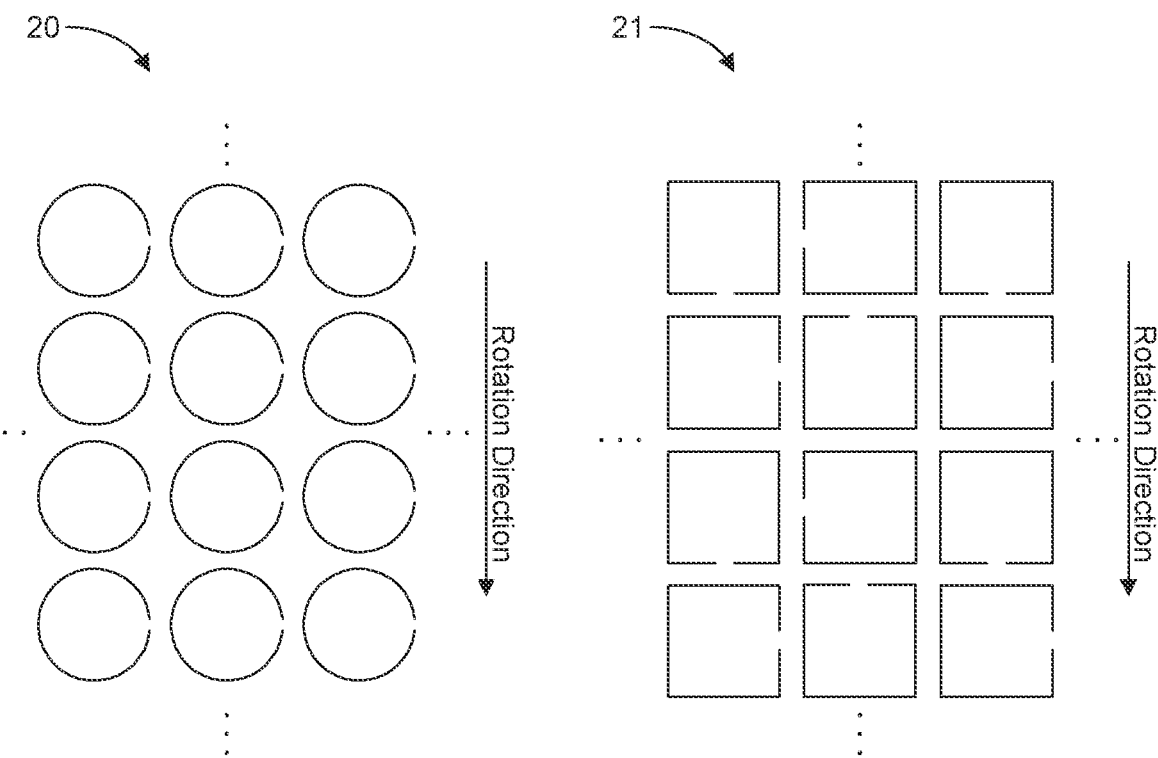
FIG. 2A
FIG. 2B

METAMATERIAL BASED TORQUE AND SHAFT ROTATIONAL SPEED SENSOR

BACKGROUND

A pedelec (from pedal electric cycle) or Electronically Power Assisted Cycles (EPAC) is a type of electric bicycle where the rider's pedaling is assisted by an electric motor. The central point of a pedelec is the electric motor support that allows the user to overcome large distances or slopes with a desired level of physical effort. To make this possible an elaborate engine control system is required.

The basis of this control system is a torque sensor that measures the rotational torque applied by the user. As a user pedals, a torque is applied to the right pedal and a torque is applied to the left pedal. Available torque sensors are expensive, especially for dual torque measurements applied on both pedals. Furthermore, an additional pedal frequency sensor (i.e., pedal rotational speed sensor) is required which, in state of the art solutions, involves an additional sensor system that adds additional cost.

Accordingly, a sensor system that provides a cost effective solution for a measuring torque in a pedelec and/or combining a torque sensor and a pedal frequency sensor into a single sensor may be desirable.

SUMMARY

Embodiments are directed to a sensor system that implements a metamaterial-based torque sensor concept to a pedelec. Such a system is cost-effective and fully integrable into the bottom bracket of a pedelec, and can also provide dual measurement capabilities for measuring torque applied to both pedals. The sensor system described herein also provides the capabilities of combining a torque sensor and a pedal frequency sensor into one system or into a single sensor.

One or more embodiments provide a torque measurement system, including: an outer rotational shaft configured to rotate about a rotational axis, wherein the outer rotational shaft is a hollow shaft having an interior volume; an inner rotational shaft arranged in the interior volume of the outer rotational shaft and configured to rotate about the rotational axis, wherein the outer rotational shaft is mechanically coupled to the inner rotational shaft at a first coupling location via a first coupling structure, wherein a rotation of the inner rotational shaft causes a rotation of the outer rotational shaft via the first coupling structure, wherein at least one torque applied to the inner rotational shaft is translated into a first torque-dependent angular shift between the inner rotational shaft and the outer rotational shaft about the rotational axis; a first metamaterial track mechanically coupled to the outer rotational shaft and configured to co-rotate with the outer rotational shaft, wherein the first metamaterial track is arranged at least partially around of the rotational axis, and wherein the first metamaterial track includes a first array of elementary structures; a second metamaterial track mechanically coupled to the inner rotational shaft and configured to co-rotate with the inner rotational shaft, wherein the second metamaterial track is arranged at least partially around the rotational axis, and wherein the second metamaterial track includes a second array of elementary structures, wherein the first metamaterial track and the second metamaterial track are mutually coupled to each other by a first torque dependent coupling, thereby forming a first mutually coupled structure; at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and at least one first receiver configured to receive the first electro-magnetic receive signal.

One or more embodiments provide a torque measurement system, including: an outer hollow rotational shaft having a first interior volume and configured to rotate about a rotational axis in a rotation direction, wherein the outer hollow rotational shaft has a first interior volume; an inner hollow rotational shaft having a second interior volume and arranged in the first interior volume, wherein the inner hollow rotational shaft is configured to rotate about the rotational axis in the rotation direction; a center rotational shaft arranged in the second interior volume and configured to rotate about the rotational axis in the rotation direction, wherein the inner hollow rotational shaft is mechanically coupled to the center rotational shaft at a first coupling location via a first coupling structure, wherein a rotation of the center rotational shaft causes a rotation of the inner hollow rotational shaft via the first coupling structure, wherein the outer hollow rotational shaft is mechanically coupled to the inner hollow rotational shaft at a second coupling location via a second coupling structure, wherein the rotation of the inner hollow rotational shaft causes a rotation of the outer hollow rotational shaft via the second coupling structure, wherein at least one torque applied to the center rotational shaft is translated into a first torque-dependent angular shift between the outer hollow rotational shaft and the inner hollow rotational shaft about the rotational axis; a first metamaterial track mechanically coupled to the center rotational shaft and the inner hollow rotational shaft via the first coupling structure and configured to co-rotate with the center rotational shaft and the inner hollow rotational shaft, wherein the first metamaterial track is arranged at least partially around the rotational axis, and wherein the first metamaterial track includes a first array of elementary structures; a second metamaterial track mechanically coupled to the outer hollow rotational shaft and configured to co-rotate with the outer hollow rotational shaft, wherein the second metamaterial track is arranged at least partially around the rotational axis, and wherein the second metamaterial track includes a second array of elementary structures, wherein the first metamaterial track and the second metamaterial track are mutually coupled to each other by a first torque dependent coupling, thereby forming a first mutually coupled structure; at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and at least one first receiver configured to receive the first electro-magnetic receive signal.

BRIEF DESCRIPTION OF THE DRAWINGS

Embodiments are described herein making reference to the appended drawings.

FIG. 1 illustrates a plurality of possible elementary structures according to one or more embodiments;

FIGS. 2A and 2B illustrate a segment of a mm-wave metamaterial track according to one or more embodiments;

DETAILED DESCRIPTION

Figure 3A:
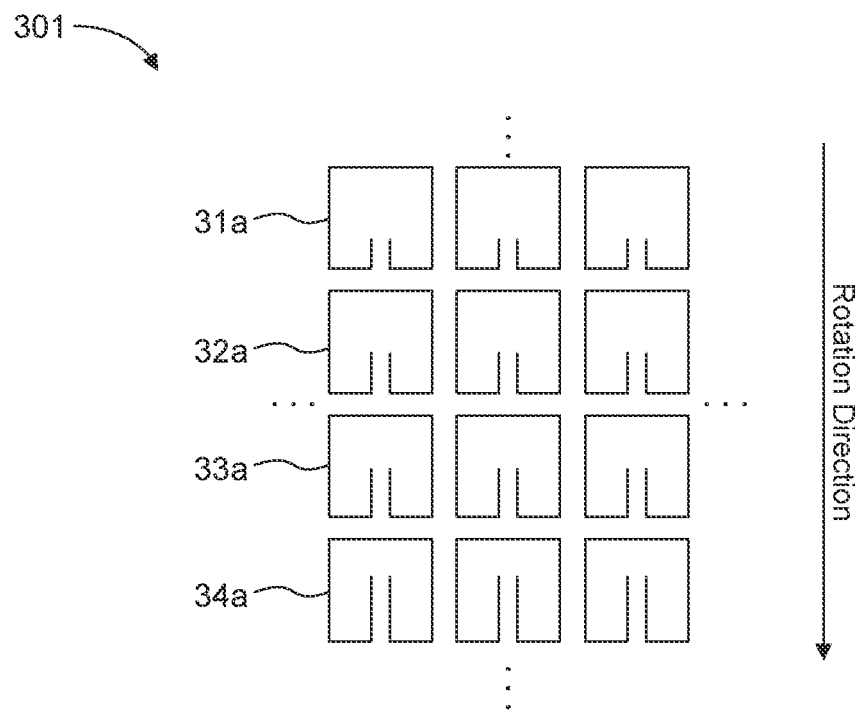
FIGS. 3A-3G show different arrangements or patterns of elementary structures of a metamaterial according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

It will be appreciated that the terms "sensor", "sensor element", and "sensing element" may be used interchangeably throughout this description, and the terms "sensor signal" and "measurement signal" may also be used interchangeably throughout this description.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1. The elementary structure size may range up to several wavelengths but is typically below one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1 illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 3B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1 further illustrates a stacked split ring resonator structure 17 having three split ring resonators stacked on top of each other. The stacked split ring resonator structure 17 may be formed by using three metallization layers stacked on top of each other. FIG. 1 further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures are arranged in arrays which typically have dimensions that are larger than a wavelength of the target frequency range and include a multitude of elementary structures in each utilized direction.

FIGS. 2A and 2B illustrate a segment of a mm-wave metamaterial track according to one or more embodiments. A mm-wave metamaterial track is a stripe of mm-wave metamaterial that has multiple elementary structures arranged in both widthwise (axial) and lengthwise (rotational) dimensions. Here, the direction orthogonal to a rotation direction may be referred to as an axial direction.

Specifically, FIG. 2A shows an example of a 2D array 20 of split ring resonators, which are expected to extend further in both horizontal and rotational (circumferential) directions. However, it will be appreciated that the split ring resonators may be exchanged with any type of elementary structure, for example, with any of those shown in FIG. 1. Each split ring resonator comprises an open ring that represents an inductivity (L) and a gap or opening that provides a capacitive coupling (C). Thus, each split ring resonator is a type of LC resonator.

The elementary structures that make up the segment of a mm-wave metamaterial track shown in FIG. 2A have a fixed arrangement or fixed property along the rotation direction. For example, the split ring resonators in each row are arranged in the same position and orientation. Furthermore, the spacing between adjacent split ring resonators in the rotation direction is fixed along the track. As such, array 20 does not have any change in property of the metamaterial structures along the track in the rotation direction. One or more properties between the structures, such as spacing and orientation, may change in the axial direction as long as each row of structures has the same pattern.

There exists a mutual coupling of the structures in the array 20, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 21 of split ring resonators in which an orientation of the split ring resonators changes in both the horizontal (width) and vertical (length) directions of the array 21 (i.e., of the metamaterial track). In other words, the location of the gap of each split ring resonator varies across neighboring structures and the rows of structures have different patterns. Here, while not required, it is possible that each row of structures has a unique pattern. As a result, the coupling effect between structures in FIG. 2B is different than the coupling effect produced by the structures shown in FIG. 2A.

Furthermore, the coupling effect between structures in FIG. 2B changes partially along the array in the rotation direction, whereas the coupling effect between structures in FIG. 2A does not change along the array in the rotation direction. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 20 may be a single metallization layer disposed or printed on a film such that the array 20 is two-dimensional. As noted above, it may also be possible to stack multiple metallization layers to form a 3D array.

Thus, arrays of elementary structures described herein include multiple repetitions of element structures having same or differing arrangements with respect to each other that induce a property on a transmission wave or signal incident thereon due to the coupling effect between the structures. As will be seen in FIGS. 3A-3G, at least one property changes along the array in the rotation direction which causes at least one coupling effect between elementary structures of the array to change continuously along the array in the rotation direction. This may allow, for example, to determine a rotational position change and/or a rotational angular position of the array. In contrast, for array 20, the properties are fixed along the array in the rotation direction such that the coupling effects between elementary structures of the array do not change and remain fixed along the array in the rotation direction.

As will become apparent in the following description, one or more mm-wave metamaterial tracks may also be used to perform torque measurements and/or off-axis angle measurements pertaining to a rotatable target object.

A mm-wave metamaterial track may be provided on a target object such that it forms a closed loop around an axis of rotation, thereby forming a 360° periodical pattern. In this way, a target object is a carrier structure for a mm-wave metamaterial track to be disposed. For example, the elementary structures of an array may have a 360° periodical pattern that may change continuously or in discrete steps around the circumference or along the perimeter of the metamaterial track. For example, tracks used for direct torque measurement may not have any change in property of the metamaterial structures along the track in the rotational direction, such as the case for array 20. In contrast, tracks used for angle measurement, rotational position change, rotational speed, rotational direction, or indirect torque measurement may change in property of the metamaterial structures along the track in the rotational direction, such as the case for those tracks shown in FIGS. 3A-3G. If the pattern changes, it may do so by having a periodic change along the closed-loop of the metamaterial track from 0° to 360°, and then repeat. In some cases, the pattern may change multiple times from 0° to 360°, giving multiple periodic changes along the metamaterial track. The pattern change may be made in incrementally (e.g., row-by-row) within the array of elementary structures such that the change is continuous.

There are diverse possibilities for changing a metamaterial property according to a 360° periodical pattern. It will also be appreciated that a rotational segment of less than 360° may also be applicable. For example, applications that measure limited angle ranges (e.g., throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

A property and/or arrangement of the metamaterial may be specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

The following different variations may be used to change the behavior of metamaterial along the perimeter of a metamaterial track. Thus, FIGS. 3A-3G show different arrangements or patterns of elementary structures of a metamaterial according to one or more embodiments. These tracks may be used for angle measurement of a corresponding carrier substrate, a rotational position change of a corresponding carrier substrate, or an indirect torque measurement of a torque applied to a rotatable shaft.

FIG. 3A is a schematic diagram of an array of elementary structures 301 of a metamaterial track according to one or more embodiments. Here, the array includes multiple rows of split ring resonators 31a-34a in which the structures in each row have a same configuration and orientation. However, the structures in different rows have different configurations.

A 360° periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of a receive signal with respect to the transmit signal can be measured. Each phase shift value or amplitude value is specific to an absolute angular position (i.e., an angular value) of the rotatable target object.

Figure 3B:
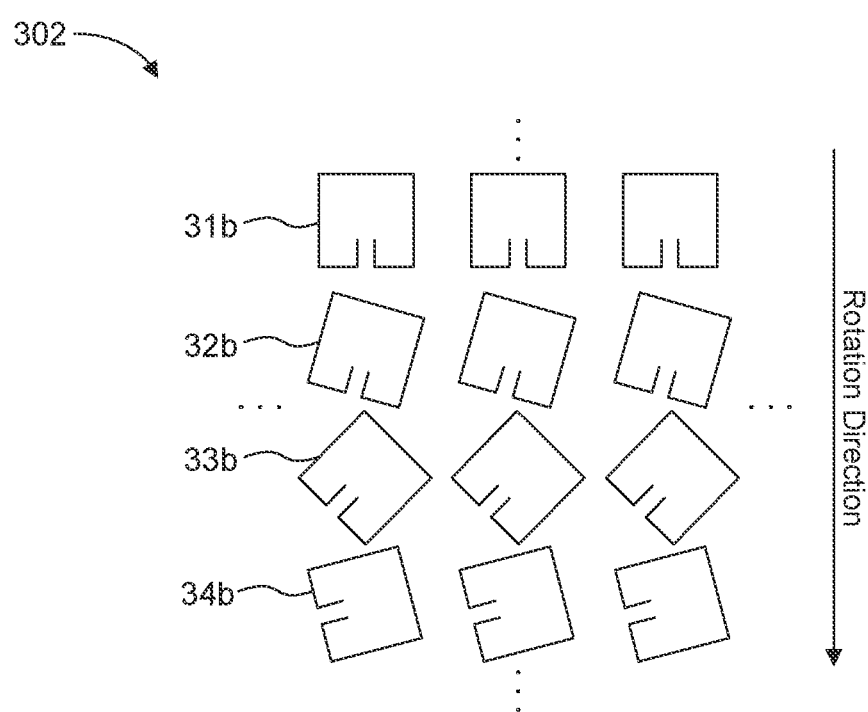

FIG. 3B is a schematic diagram of an array of elementary structures 302 of a metamaterial track according to one or more embodiments. Here, the array includes multiple rows of split ring resonators 31b-34b in which the structures in each row have a same configuration and orientation. However, the structures in different rows have different orientations.

Thus, on the surface of the target object, the split ring resonators 31b-34b are rotated or pivoted (e.g., clockwise or counterclockwise) incrementally in varying degrees along the rotation direction. As a result, the structures in each row have a different angled orientation with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 3C:
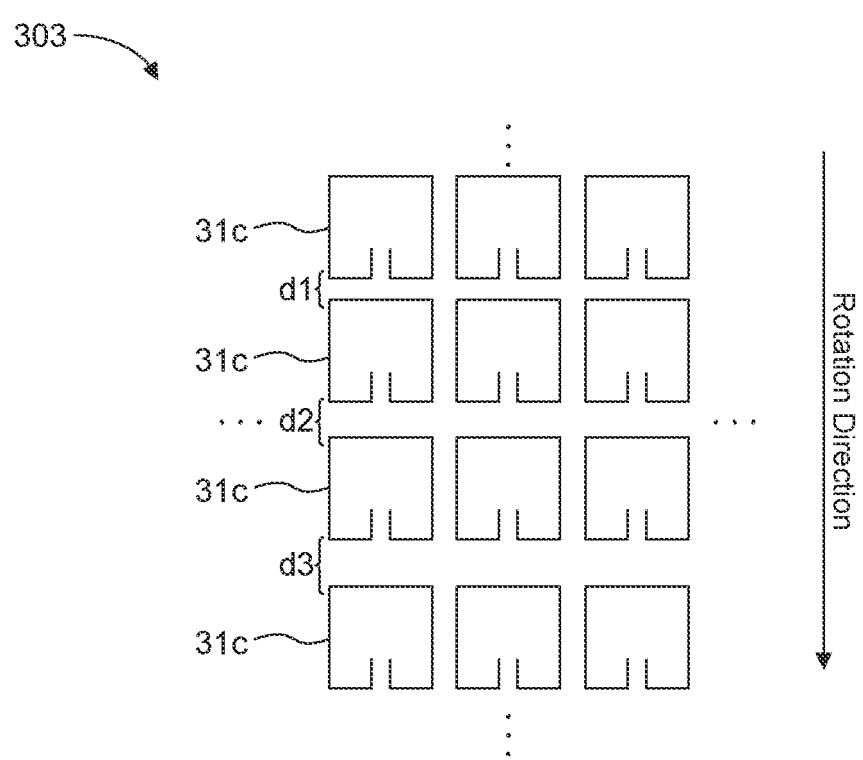

FIG. 3C is a schematic diagram of an array of elementary structures 303 of a metamaterial track according to one or more embodiments. Here, the array includes multiple rows of split ring resonators 31c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°.

Figure 3D:
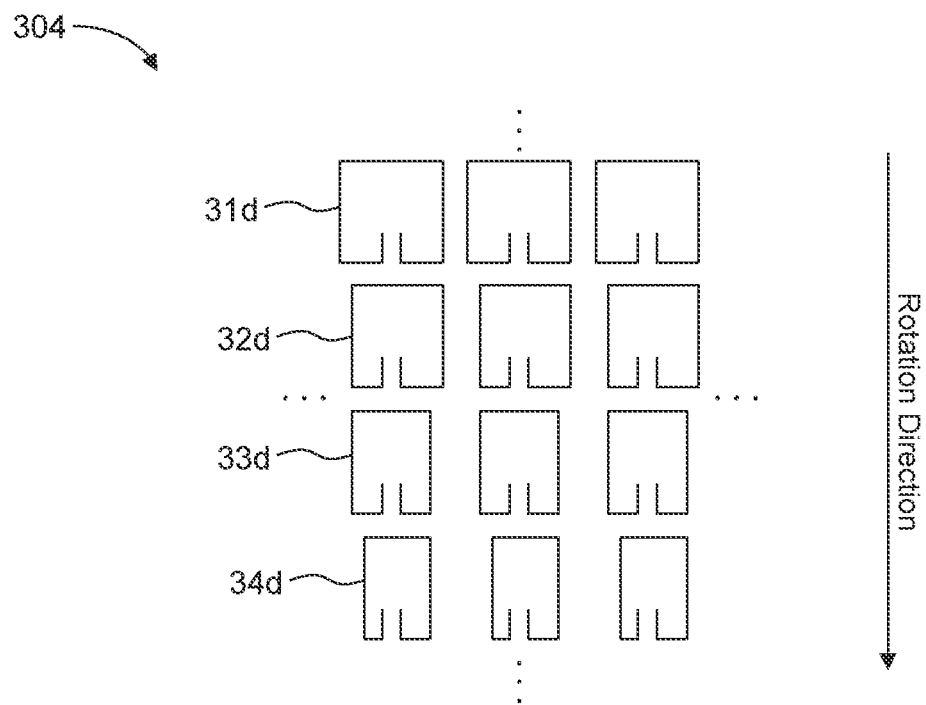

FIG. 3D is a schematic diagram of an array of elementary structures 304 of a metamaterial track according to one or more embodiments. Here, the array includes multiple rows of split ring resonators 31d-34d in which the structures in each row have a same configuration and orientation. However, the structures in different rows have different configurations.

In this case, an inductive coupling scaled by reducing or increasing the loop area in along the rotation direction. For example, the loop size of consecutive rows gradually changes along the rotation direction. Thus, the loop size of the split ring resonators 31d is larger than the loop size of the split ring resonators 32d, which is larger than the loop size of the split ring resonators 33d, and so on. This also results in a change in the spacing between structures in the direction perpendicular to the rotation direction, which may further change the capacitive coupling. This scales the inductive coupling and/or the capacitive coupling between structures in way that is periodical over 360°.

Figure 3E:
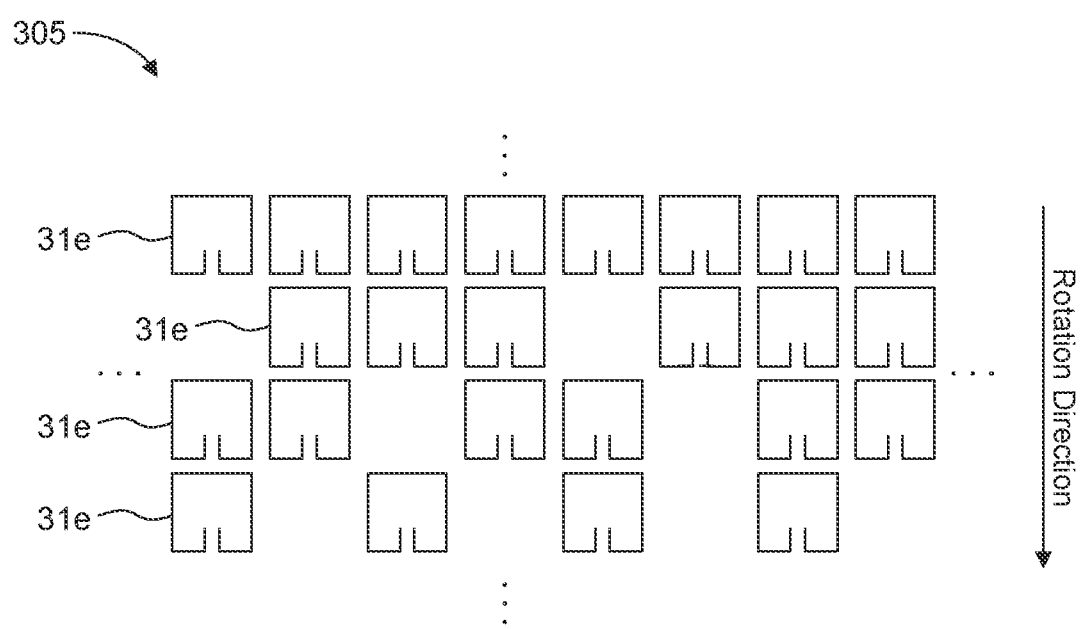

FIG. 3E is a schematic diagram of an array of elementary structures 305 of a metamaterial track according to one or more embodiments. Here, the array includes multiple rows of split ring resonators 31e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°.

Figure 3F:
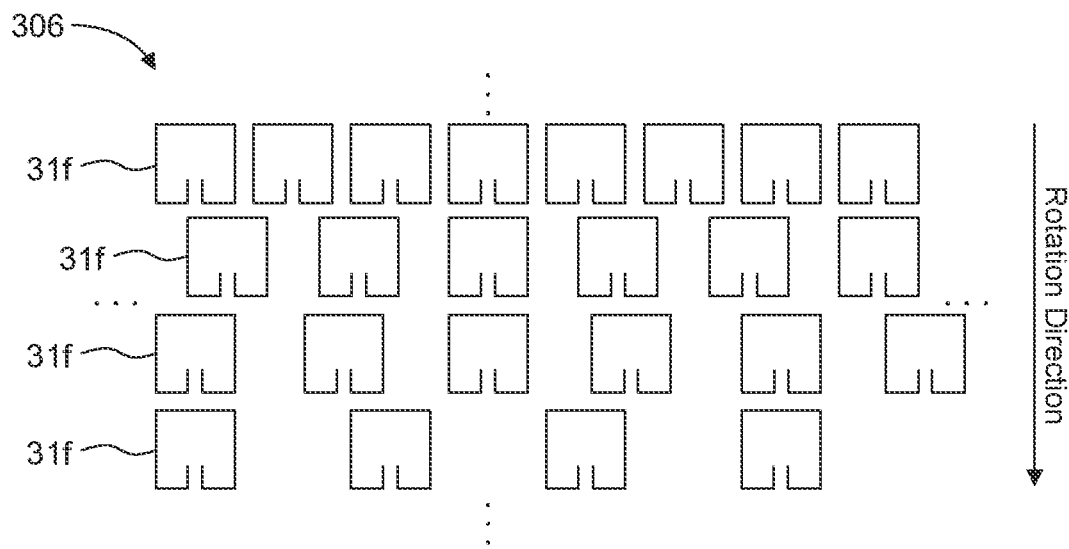

FIG. 3F is a schematic diagram of an array of elementary structures 306 of a metamaterial track according to one or more embodiments. Here, the array includes multiple rows of split ring resonators 31f in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 3G:
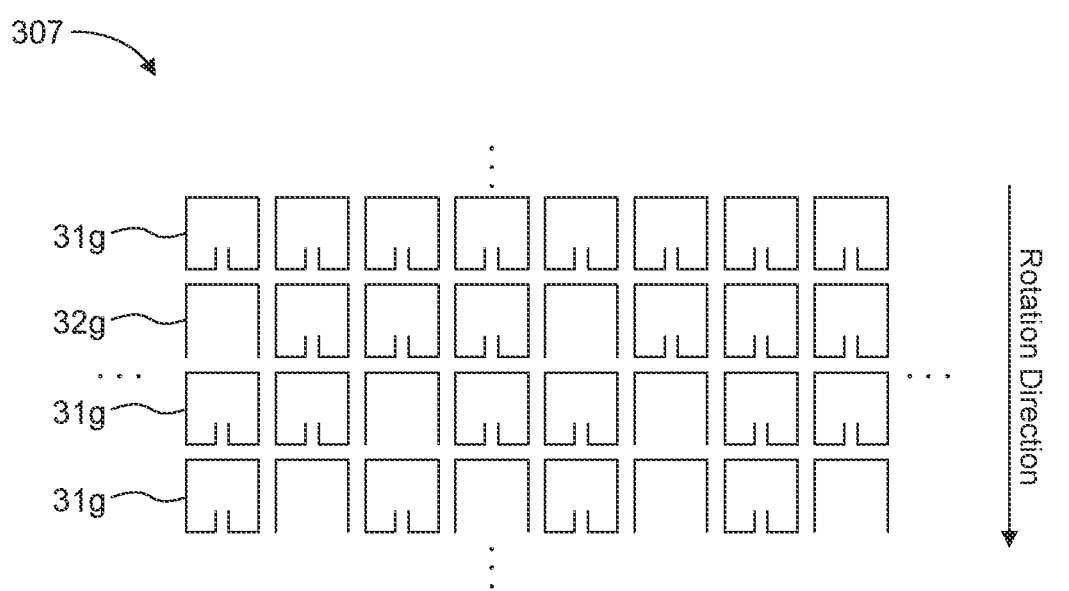

FIG. 3G is a schematic diagram of an array of elementary structures 307 of a metamaterial track according to one or more embodiments. Here, the array is a heterogeneous array of mixed different structures such that the structure types that populate the array is varied in different arrangements throughout the array. In this case, two different types of structures 31g and 32g are use in a pattern that gradually and continuously changes the inductive coupling and/or the capacitive coupling between structures in way that is periodical over 360°. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360° periodical pattern where the reflectivity and/or transmittivity is unique for each discrete angle.

Figure 4A:
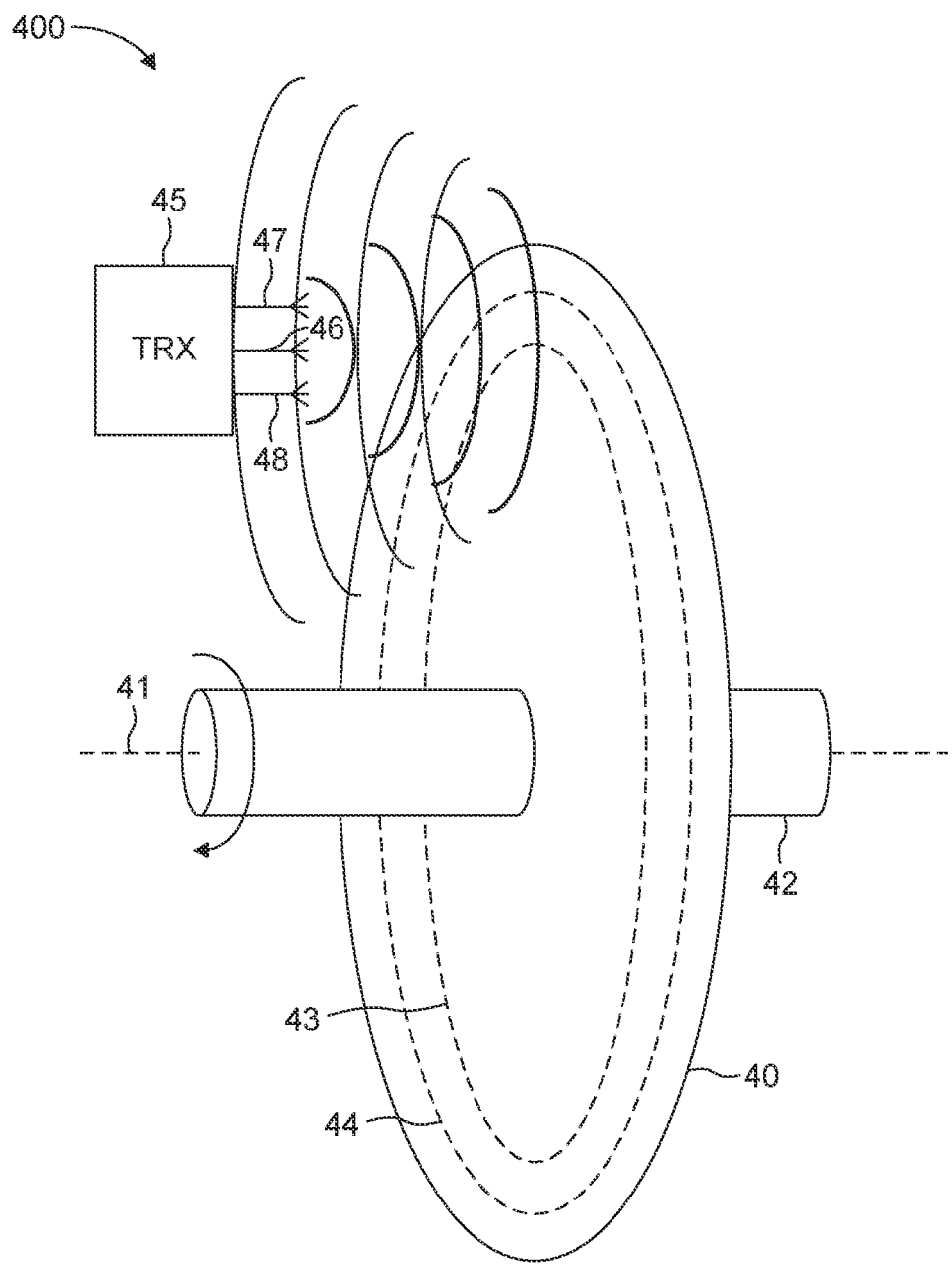
FIG. 4A is a schematic view of an angle sensor system according to one or more embodiments.

FIG. 4A is a schematic view of an angle sensor system 400 according to one or more embodiments. The angle sensor system 400 includes a rotatable target object 40 configured to rotate about an axis of rotation 41 (i.e., a rotational axis). The rotatable target object 40 may be a disc or a wheel coupled to a shaft 42 that extends along the rotational axis 41. As the shaft 42 rotates, so does the rotatable target object 40. The rotatable target object 40 represents a mechanical target for one or more mm-wave beams.

The rotatable target object 40 includes two mm-wave metamaterial tracks 43 and 44 that each form a closed loop around the shaft 42. In this example, the two mm-wave metamaterial tracks 43 and 44 are concentric loops located at different distances from the rotational axis. In some embodiments, it may be possible to use a single closed-loop metamaterial track or more than two closed-loop metamaterial tracks. The mm-wave metamaterial tracks 43 and 44 are fixed to the rotatable target object 40 such that they co-rotate with the rotatable target object 40 as it rotates.

It may also be possible to use tracks with different characteristic of the variations of the patterns, for example, implementing a sine function or a cosine function in the varying parameter of the metamaterial. Furthermore, reference tracks that do not change the characteristic of the meta material may be of interest to characterize the influence of environmental influences or setup parameters like the distance between the antenna and the meta material stripe or the temperature and humidity of the ambient environment. Multiple reference stripes with different metamaterial setups may be used to deliver different reference measurements. For example, different reference stripes may be used to provide for a minimum and a maximum of the variation of metamaterial properties.

The angle sensor system 400 further includes a transceiver TRX 45 configured to transmit and receive mm-waves. In particular, the transceiver 45 includes a transmitter antenna 46 configured to transmit a mm-wave beam (i.e., an electro-magnetic transmit signal) at the two metamaterial tracks 43 and 44. The transmitter antenna 46 may be further representative of multiple antennas or an antenna array. For example, in order to achieve a homogeneous radiation on each metamaterial track, multiple transmitter antennas or transmitter antenna arrays may be used such that each antenna or antenna array is focused on a different track. In this case, the transmitter antennas can be operated in parallel or by separate transmitters.

The transceiver 45 also includes two receiver antennas 47 and 48, each configured to receive a partially-reflected mm-wave (i.e., an electro-magnetic receive signal) from a corresponding metamaterial track of the two metamaterial tracks 43 and 44. In other words, the two receiver antennas 47 and 48 are isolated from each other in a way that receiver antenna 47 substantially receives a partially-reflected mm-wave only from one of the tracks (e.g., metamaterial track 44) and receiver antenna 48 substantially receives a reflected mm-wave only from the other one of the tracks (e.g., metamaterial track 43). Thus, isolations between the antennas or between the tracks, such as a metal stripe, may be provided.

While a small portion of a non-corresponding reflected mm-wave may be received at each antenna 47 and 48, this signal may be attenuated to the extent that the signal can be ignored or filtered out as noise by the transceiver 45.

In addition, it will be appreciated that the transceiver 45 may include two transmitter antennas instead of a single transmitter antenna, where each transmitter antenna is arranged to target a single metamaterial track. Thus, each mm-wave may be exclusively incident on a corresponding track. Alternatively, a transmitter antenna may target two or more tracks, where the mm-wave is exclusively incident on the corresponding tracks. Thus, different groups of tracks may be targeted by different transmitter antennas.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams where different receiving antenna and receiving circuitry correspond to different closed-loop metamaterial track on a one-to-one basis. The transmitters and receivers may be electrically coupled to a system controller and/or a DSP.

Figure 4B:
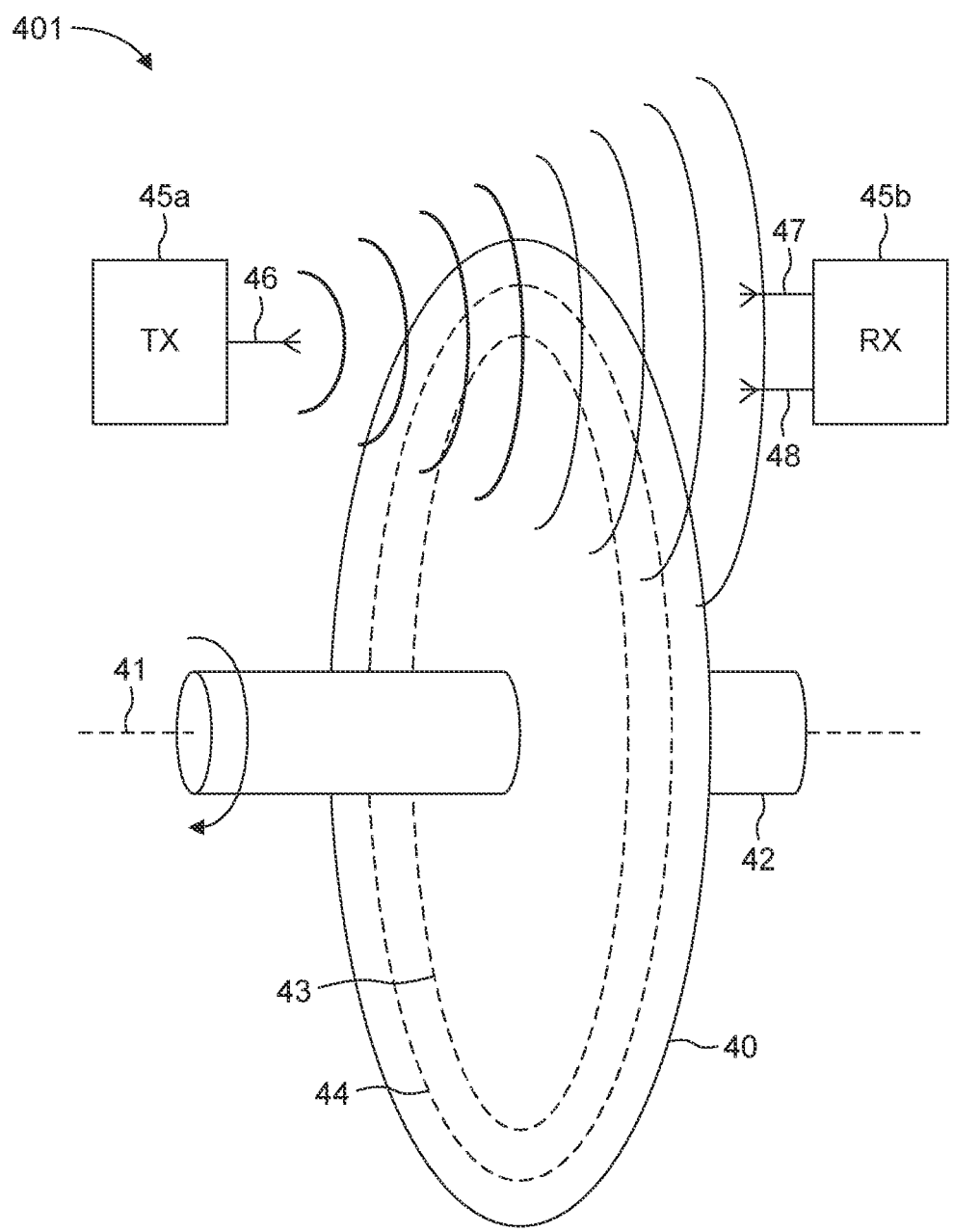
FIG. 4B is a schematic view of an angle sensor system according to one or more embodiments.

FIG. 4B is a schematic view of an angle sensor system 401 according to one or more embodiments. The angle sensor system 401 is similar to the angle sensor system 400 depicted in FIG. 3A, with the exception that the angle sensor system 301 is configured to monitor a mm-wave that passes through the two metamaterial tracks 43 and 44 instead of monitoring reflected mm-wave as was the case in FIG. 3A. As a result, angle sensor system 301 includes a transmitter 45a, including the transmitter antenna 46, and a receiver 45b, including the receiver antennas 47 and 48. The receiver antenna 47 is configured to receive a partially transmitted mm-wave (i.e., an electro-magnetic receive signal) as a result of the transmitted mm-wave interacting with (i.e., being partially absorbed by and transmitted through) the metamaterial track 44. Similarly, the receiver antenna 48 is configured to receive a partially transmitted mm-wave (i.e., an electro-magnetic receive signal) as a result of the transmitted mm-wave interacting with (i.e., being partially absorbed by and transmitted through) the metamaterial track 43.

It will also be appreciated that a combination of FIGS. 4A and 4B may be realized. For example, one receiver may be arranged for detecting and measuring a partially-reflected mm-wave from one of the metamaterial tracks (i.e., metamaterial track 44) and another receiver may be arranged for detecting and measuring a partially transmitted mm-wave that passes through the other one of the metamaterial tracks (i.e., metamaterial track 43). In addition, two receivers may be used for analyzing a same metamaterial track, where one detects and measures a partially-reflected mm-wave and the other detects and measures a partially-transmitted mm-wave. Accordingly, one metamaterial track may be configured with higher reflectivity and the other metamaterial track may be configured with a higher absorptivity with respect to one another.

Based on the embodiments shown in FIGS. 4A and 4B and combinations thereof, an electro-magnetic transmit signal is converted into an electro-magnetic receive signal by interacting with a metamaterial track. The interaction may include a reflection, an absorption, a transmission, or a combination thereof. Each receiver antenna is coupled to receiver circuitry configured to demodulate a receive signal in order to determine a characteristic of the receive signal. An absolute angular position of the rotatable target object 40 is then determined by the receiver circuit or a system controller utilizing a signal processor based on the determined characteristic.

In particular, each metamaterial track is configured such that a characteristic or property of the metamaterial changes along the perimeter of the track. Thus, how the metamaterial interacts with a mm-wave changes along the perimeter of the track. For example, the elementary structures of an array have a 360° periodical pattern that changes continuously around the circumference of the rotatable target and/or along the perimeter of the metamaterial track. Thus, the pattern continuously changes from 0° to 360° along the closed-loop of the metamaterial track, and then repeats.

A property and/or arrangement of the metamaterial is specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

For commutation of multi-pole electric motors with 3N poles, the electric angle being the sum of all poles has to be 360°. Thus, the periodical pattern of the elementary structures of an array for the mechanical angle may have a period of 360°/N, with N being an integer number. That is, the periodical pattern repeats every 360°/N. In this case, multiple predetermined (i.e., reference) angular positions of the rotatable target object may be known, and each absolute angular position has an absolute angular value from one of the reference angular positions. Each reference angular position is detectable based on the characteristic or property of the metamaterial at a specific position along the track.

The characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof.

A receiver circuit may receive and demodulate a receive signal, and evaluate an amplitude modulation and/or a phase modulation of the receive signal using amplitude analysis and/or phase analysis, respectively. For example, the receiver circuit may evaluate an amplitude variation or a phase shift of the receive signal. The receive circuit may then determine an absolute angular position of the metamaterial track and/or the rotatable target object based on the determined amplitude modulation or phase modulation. For example, the receiver circuit may refer to a look-up table provided in memory that stores angular positions relative to a specific amplitude modulation or phase modulation.

Thus, either the amplitude or the phase of the received signal is analyzed with respect to the same property of the transmitted signal. The metamaterial is a passive structure, it cannot the frequency of the signal. However, it can change its own resonance frequency or, better said, the locations of its poles and zeros, which can then influence the reflected or the transmitted signal and be detected in amplitude and phase or in real and imaginary part of the signal. Both combinations describe the possible influence completely. Analyzing the shift of a resonance or a pole or a zero may also be characterized over the frequency with a frequency sweep of the transmit signal, but requires a more complex evaluation circuitry.

As an example for determining an absolute angular position or discrete angular value for a given metamaterial track, the transceiver 45 may transmit a continuous mm-wave as a carrier signal that has a constant frequency. Each metamaterial track receives the carrier signal and partially reflects or transmits the signal back at the transceiver 45. The transceiver 45 includes a receiver circuit that includes two demodulators (e.g., two mixers), each configured to demodulate a received signal from a corresponding metamaterial track. Alternatively, the receiver circuit may include a multiplexer coupled to single demodulator that demodulates both received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) can correspond to the absolute angular position of the corresponding metamaterial track.

In addition, a phase shift between two receive signals may be analyzed for determining an absolute angular position. For example, the rotated patterns of metamaterial tracks 43 and 44 may be the same but shifted 90° (e.g., clockwise or counterclockwise) from each other such that there is a 90° phase shift in the extracted signals resultant from the two metamaterial tracks after the evaluation of the metamaterial property. This means that two metamaterial tracks at the same corresponding angle of rotation would produce extracted signals that are 90° out of phase from each other. This essentially produces a sine measurement signal and a cosine measurement signal while the rotatable target object is rotating, that when compared to each other identifies a unique angular position.

Alternatively, two receiver antennas can be focused on the same metamaterial tracks, but spaced 90° apart. In other words, the placement of the two receiver antenna is such that the pattern of the metamaterial at those locations is shifted with respect to each other that results in a 90° phase shift in the extracted signals resultant at those two locations. Again, this essentially produces a sine wave measurement signal and a cosine wave measurement signal while the rotatable target object is rotating, that when compared to each other identifies a unique angular position.

Analyzing a receive signal from a single track may be used to determine the angular position (i.e., an angular value) of the rotatable target object. From this, the rotational speed may also be calculated by determining a rate of change in the angular values. Additionally, by obtaining two measurement signals (e.g., two 90° phase shifted signals), a rotation direction of the rotatable target object may also be determined.

For example, the rotation direction may be determined at each zero-crossing or at some other switching threshold of a first measurement signal (e.g., a sine measurement signal or a cosine measurement signal). For example, a DSP may determine whether the first measurement signal has a zero-crossing on a falling edge or on a rising edge, and may further analyze the correlation to a negative value or positive value of a second measurement signal (e.g., the other of the sine measurement signal and the cosine measurement signal).

For example, a negative value of the second measurement signal at a falling edge of the first measurement signal may indicate a first rotation direction. A positive value of the second measurement signal at a rising edge of the first measurement signal may also indicate the first rotation direction. A positive value of the second measurement signal at a falling edge of the first measurement signal may indicate a second rotation direction. A negative value of the second measurement signal at a rising edge of the first measurement signal may also indicate the second rotation direction. Since the second measurement signal is 90° phase shifted to the first measurement signal, the determination of rotation direction is less susceptible to error that may be cause by external stray fields, biasing noise, and other types of interference.

In addition, or in the alternative, the DSP may evaluate the sign of the second measurement signal at each zero crossing of the first measurement signal. If the sign of the second measurement signal alternates between two successive zero crossings (+− or −+), the rotation direction remains the same. However, if the sign of the second measurement signal between two successive zero crossings does not alternate, (++ or −−) a direction change is detected by the DSP.

Alternatively, in cases where sine and cosine are available for the calculation of the angle, the rotation direction is self-evident depending on increase or decrease of the angle value without using a switching threshold.

The wide range of flavors that metamaterials offer with different structures, layers, and mutual coupling could be evaluated based on a complete measurement of the parameters using a frequency modulated signal over the range in which the spectral relevant effects of the metamaterial appear. However, the target applications will provide a low cost measurement compared to a traditional radar. Thus, the circuit effort may be minimized and the RX/TX setup will depend on the final metamaterial design.

Figure 5A:
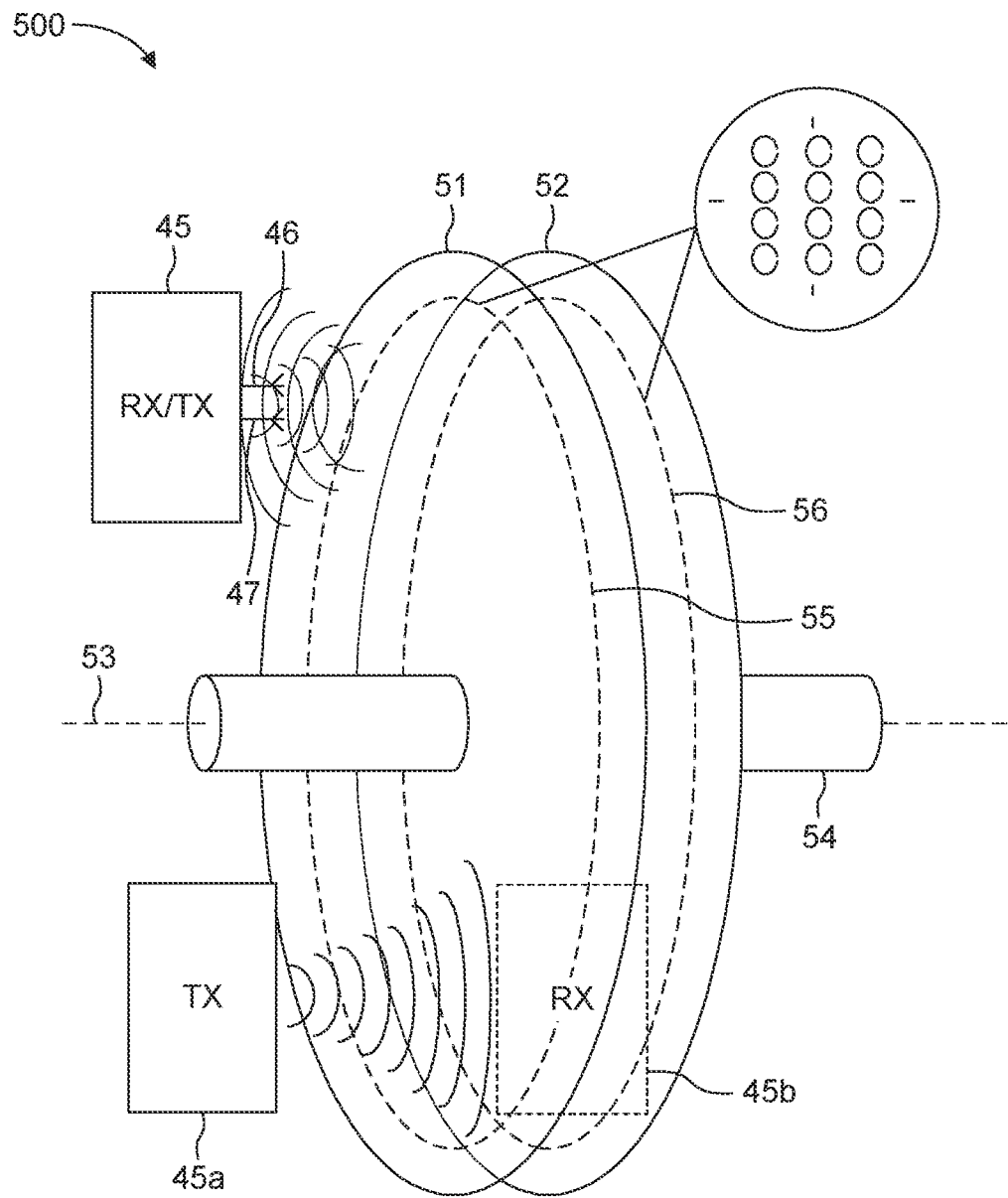
FIG. 5A is a schematic view of a torque measurement system according to one or more embodiments.

FIG. 5A is a schematic view of a torque measurement system 500 according to one or more embodiments. The torque measurement system 500 includes a first rotatable target object 51 as a first rotatable carrier structure and a second rotatable target object 52 as a second rotatable carrier structure. Both carrier structures are configured to rotate about an axis of rotation 53 (i.e., a rotational axis). The rotatable target objects 51 and 52 may be a disc or a wheel coupled to a shaft 54 that extends along the rotational axis 53. As the shaft 54 rotates, so do the rotatable target objects 51 and 52. The rotatable target objects 51 and 52 represent mechanical targets for one or more mm-wave beams. Additionally, the rotatable target objects 51 and 52 are laterally separated from each other by a distance along the shaft 54. In particular, they are laterally spaced apart from each other in a transmission direction of mm-wave beams.

Each rotatable target object 51 and 52 includes a mm-wave metamaterial track 55 and 56, respectively, that each form a closed loop around the shaft 54. In this regard, each target object 51 and 52 is a carrier structure for its respective mm-wave metamaterial track. The mm-wave metamaterial tracks 55 and 56 are fixed to a respective rotatable target object 51 or 52 such that they co-rotate with the respective rotatable target object 51 or 52 as it rotates. Additionally, the mm-wave metamaterial tracks have the same size and shape. As such, in a similar manner regarding the rotatable target objects 51 and 52, the metamaterial tracks 55 and 56 are laterally spaced apart from each other, and, more particularly, are laterally spaced apart from each other in a transmission direction of mm-wave beams.

According to at least one embodiment, metamaterial tracks 55 and 56 each have an array of structures whose properties do not change in the rotation direction, as explained above in reference to FIG. 2A. Furthermore, the two metamaterial tracks 55 and 56 are close enough that the two tracks have a mutual coupling with each other that is induced by a field effect (e.g., an electric field coupling, a magnetic field coupling, or an electromagnetic field coupling) thereby forming a resonant multitrack structure (i.e., a mutually coupled structure). The mutual coupling between tracks 55 and 56 results in a torque-dependent behavior or interaction with an mm-wave where the torque-dependent behavior or interaction is a torque-dependent reflection, a torque-dependent absorption, a torque-dependent transmission, or a torque-dependent combination thereof.

When the shaft 54 rotates, there is a torque dependent shift in angular position (i.e., an angular shift) between the two metamaterial tracks 55 and 56 due to the torque applied to the shaft 54. This results in a torque dependent shift in the mutual coupling between the two metamaterial tracks 55 and 56. Since multiple of the metamaterial properties change simultaneously in response to the applied torque, multiple mm-wave parameters of a signal either transmitted, reflected, or emitted by mutually coupled metamaterial tracks will depend on the applied torque. Two or more mm-wave parameters of a same signal or of different signals may be evaluated simultaneously to discriminate the applied torque. Similarly, a single parameter of two or more signals may also be evaluated to discriminate the applied torque. Consequently, a measurement of all relevant variations can be used to improve the unambiguousness of the torque determination.

The torque measurement system 500 further includes a transceiver TRX 45 configured to transmit and receive mm-waves, or a transmitter 45a and a receiver 45b configured to transmit and receive mm-waves. The transmitter 45a and a receiver 45b may be placed such that the two rotatable target objects 51 and 52 and, thus, the two tracks 55 and 56, are arranged between the transmitter 45a and a receiver 45b.

The transceiver 45 includes a transmitter antenna 46 configured to transmit a mm-wave beam (i.e., an electromagnetic transmit signal) as a wireless electro-magnetic signal focused at the two metamaterial tracks 55 and 56. In the case that a separate transmitter 45a and receiver 45b is used, the transmitter 45a may be equipped with the transmitter antenna 46.

The transceiver 45 also includes a receiver antenna 47 configured to receive a partially-reflected mm-wave (i.e., an electro-magnetic receive signal) as a wireless electro-magnetic signal from both metamaterial tracks 55 and 56. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

In the case that a separate transmitter 45a and receiver 45b is used, the receiver 46a may be equipped with the receiver antenna 47. Here, the torque measurement system 500 is configured to monitor mm-waves that pass through the two metamaterial tracks 55 and 56 instead of monitoring reflected mm-waves as was the case with the transceiver 45. As a result, the receiver antenna 47 is configured to receive partially transmitted mm-waves (i.e., electro-magnetic receive signals) as a result of the transmitted mm-wave interacting with (i.e., being partially absorbed by and transmitted through) the metamaterial tracks 55 and 56.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams. The transmitters and receivers may be electrically coupled to a system controller and/or a DSP.

As noted above, the two metamaterial tracks 55 and 56 are close enough that the tracks have a mutual coupling (e.g., an electric field coupling, a magnetic field coupling, or an electromagnetic field coupling) with each other thereby forming a resonant structure that results in a torque dependent shift of the transmission or the reflection that is caused by the resonant structure. The torque dependent mutual coupling between the metamaterial tracks 55 and 56 may be capacitive, inductive, or a combination thereof. In the latter case, one type of coupling may be dominant. For example, capacitive coupling between the two tracks may be dominant.

As an example, in the case that the two metamaterial tracks 55 and 56 are made up of elementary structures 15, the elementary structures 15 of the two metamaterial tracks 55 and 56 couple together to form a split ring resonator 18 as an elementary structure having two poles, which is a resonator whose poles are modified by the shift between the two layers caused by the applied torque. Thus, the mutual coupling characteristic between the two tracks 55 and 56 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

In another example, the two metamaterial tracks 55 and 56 are made up of elementary structures 2, the elementary structures 2 of the two metamaterial tracks 55 and 56 couple together to form a stacked split ring resonator structure 17 having four pols (2 poles for each elementary structure 2), which is a resonator whose poles are modified by the shift between the two layers caused by the applied torque. Thus, the mutual coupling characteristic between the two tracks 55 and 56 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

It will be appreciated that other combinations of elementary structures is possible, forming different types of mutually coupled structures that have one or more characteristics that change based on the rotational displacement caused by the applied torque.

It is also noted that the mm-wave, being an electromagnetic wave, has an electrical field component that stimulates the capacitance of a metamaterial track or the resonant multitrack structure and a magnetic field component that stimulates the inductance of a metamaterial track or the resonant multitrack structure. Each elementary structure reflects a part of the mm-wave directly, transmits a part of the mm-wave directly, and receives a part of the energy and stores it in its resonance oscillation. The oscillation caused by the transmission radiates a part of the energy in either direction. Thus, each metamaterial track absorbs part of the energy and stores it. Additionally, each metamaterial track eventually emits the energy that has been absorbed and stored.

The resonant multitrack structure, also referred to as a mutually coupled (multitrack) structure, may also be viewed as a single structure that emits a mm-wave, either as a reflection and/or a transmission, in response to the transmitted mm-wave from the transceiver 45 impinging thereon. This emitted wave has a torque dependent property that may be evaluated by the receiver circuit to determine the applied torque. For example, a phase shift and/or an amplitude shift of the received signal with respect to the transmitted mm-wave may be determined and evaluated to determine the applied torque.

In particular, when the shaft 54 rotates, there is a torque dependent shift in angular position (i.e., an angular shift) between the two metamaterial tracks 55 and 56 due to the torque applied to the shaft 54. For example, the target objects 51 and 52 rotate by different amounts due to the applied torque. As a result, the absolute angular position or discrete angular value corresponding to track 55 is different than the absolute angular position or discrete angular value corresponding to track 56, resulting in angular difference or angular shift that is proportional to the applied torque. The coupling effect between tracks 55 and 56 is torque-dependent and changes based on their angular shift resultant from the applied torque. This change in coupling in turn impacts at least one coupling-dependent property of a signal interacting with the mutually coupled structure, which can be measured to determine the applied torque.

A processor at the receiver is configured to receive at least one signal from the mutually coupled structure and determine the applied torque based on one or more evaluated properties of the at least one received signal. The processor may determine the applied torque based on the evaluated property or properties using, for example, a look-up table or an algorithm.

For example, the signal emitted by the mutually coupled structure formed by tracks 55 and 56 may have at least one property or combination of properties unique to the angular shift therebetween, and thus unique to the applied torque. This is referred to as a direct torque measurement.

Alternatively, the processor may receive signals from each track 55 and 56 of the mutually coupled structure, determine a torque-dependent absolute angular position corresponding to each track, determine the angular difference or shift therefrom, and then determine the applied torque based on the determined angular difference using, for example, a look-up table or an algorithm. In this case, the tracks 55 and 56 may have array structures that vary in the rotation direction, as described in reference to 3A-3G, so that the angular position of each track can be determined. This is referred to as an indirect torque measurement.

As an example for determining an absolute angular position or discrete angular value for a given metamaterial track, the transceiver 45 may transmit a continuous mm-wave as a carrier signal that has a constant frequency. Each metamaterial track that receives the carrier signal may partially reflect the signal back at the transceiver 45. The transceiver 45 includes a receiver circuit that includes two demodulators (e.g., two mixers), each configured to demodulate a received signal from a corresponding metamaterial track. Alternatively, the receiver circuit may include a multiplexer coupled to single demodulator that demodulates two received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) corresponds to the absolute angular position of the corresponding metamaterial track. It is also possible for the receiver circuit to match the phase and/or amplitude differences of two received signals (i.e., one from each track 55 and 56) directly to the torque without calculating the absolute angular positions, via a mapping, look-up table, or the like, that maps differential values of phase and/or amplitude to different amounts of torque (i.e., torque values).

An applied torque for a given mutually coupled structure may be determined in a similar manner for a direct torque measurement. For instance, the transceiver 45 may transmit a continuous mm-wave as a carrier signal that has a constant frequency at the mutually coupled structure. The mutually coupled structure that receives the carrier signal may partially reflect the signal back at the transceiver 45. The mutual coupling between two metamaterial tracks of the mutually coupled structure depends on the applied torque, which is affects a torque dependent property of the reflected signal.

The transceiver 45 includes a demodulator that is configured to demodulate the received signal and a processor that is configured to evaluate a property of the received signal using at least one of phase analysis, amplitude analysis, or spectral analysis, and determine the applied torque based on the evaluated property.

In particular, the processor is configured to determine a phase and/or an amplitude of each received signal, and compare the determined phase and/or amplitude to the phase and/or amplitude of the carrier signal, respectively, to derive the applied torque. A certain change in phase or amplitude relative to the carrier signal (i.e., a phase shift or an amplitude shift) corresponds to the applied torque.

In summary, the torque measurement system 500 uses two target objects (i.e., two carrier structures) 51 and 52 each with a metamaterial pattern 55 and 56 on their neighboring surfaces. Each carrier structure is fixed to a shaft 54 within a certain distance between the neighboring carrier structures. If a torque is applied to the shaft 54, the shaft 54 winds depending on its thickness and its Young's modulus. The distance between the carrier structures is close enough to ensure that the two metamaterial tracks 55 and 56 mutually couple. Depending on the shift of the two metamaterial patterns of the two metamaterial tracks, the coupling effect between the two metamaterial tracks changes. This coupling effect is unique to the amount of applied torque. As a result, the change in the coupling effect causes a property of one or more signals emitted from the metamaterial tracks 55 and 56 to be altered, which can be measured and analyzed for determining the applied torque.

Figure 5B:
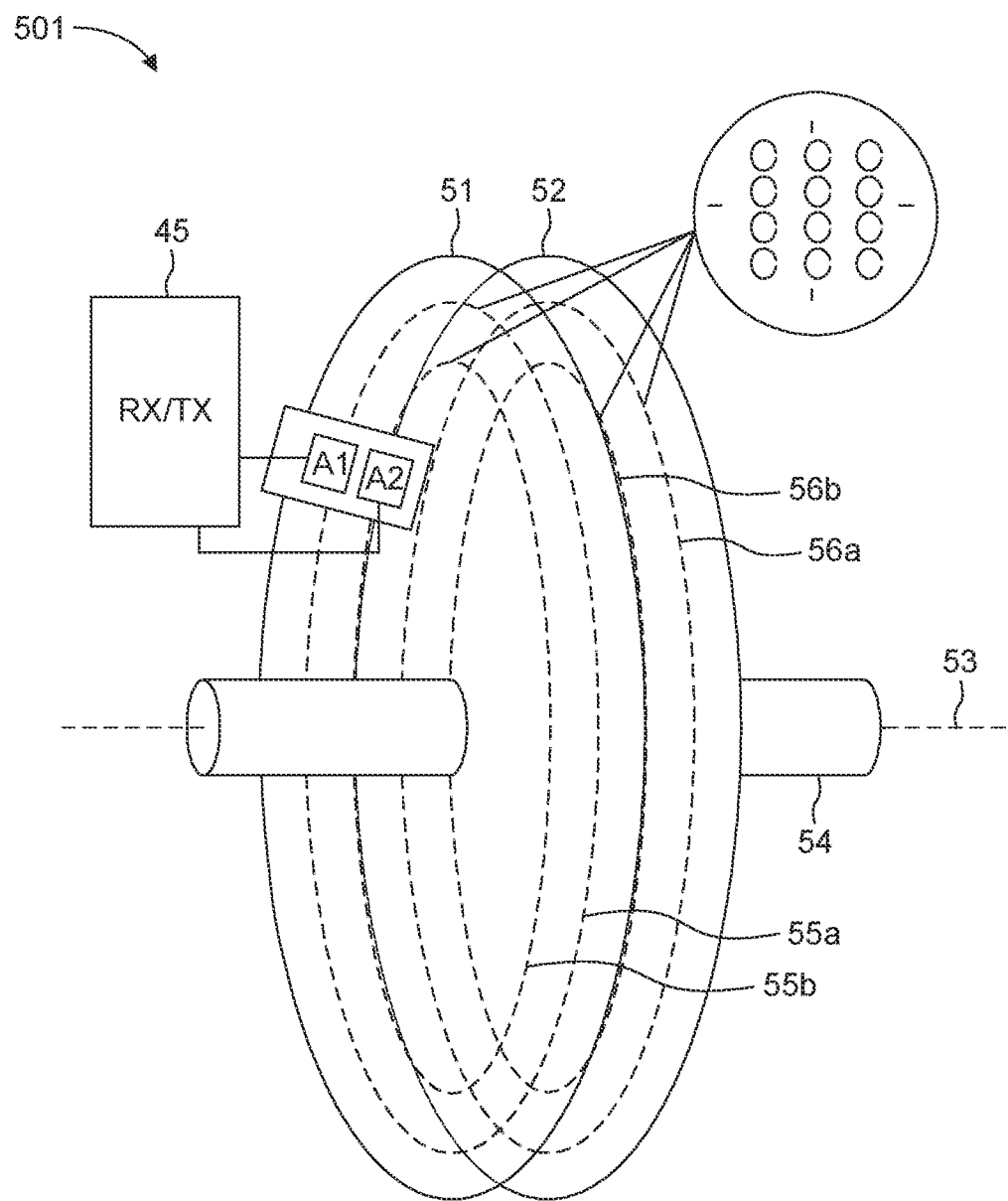
FIG. 5B is a schematic view of another torque measurement system according to one or more embodiments.

FIG. 5B is a schematic view of a torque measurement system 501 according to one or more embodiments. The torque measurement system 501 is similar to the torque measurement system 500 depicted in FIG. 5A, with the exception that the torque measurement system 401 includes additional metamaterial tracks on each rotatable target object 51 and 52. Two metamaterial tracks 55a and 55b are attached to rotatable target object 51 and two metamaterial tracks 56a and 56b are attached to rotatable target object 52. The two mm-wave metamaterial tracks 55a and 55b attached to rotatable target object 51 are concentric loops located at different distances from the rotational axis 53. Similarly, the two mm-wave metamaterial tracks 56a and 56b attached to rotatable target object 52 are concentric loops located at different distances from the rotational axis 53.

Furthermore, metamaterial tracks 55a and 56a are aligned (i.e., are located at the same radial distance from the rotational axis 53) and are in close proximity such that they are mutually coupled. Similarly, metamaterial tracks 55b and 56b are aligned (i.e., are located at the same radial distance from the rotational axis 53) and are in close proximity such that they are mutually coupled. Thus, two mutually coupled structures are formed, where the first one is formed by tracks 55a and 56a, and the second one is formed by tracks 55b and 56b.

In addition, the torque measurement system 401 includes two antennas A1 and A2 both configured to transmit and receive mm-wave signals. Here, antenna A1 is aligned with metamaterial tracks 55a and 56a, and, as such, is configured to transmit a mm-wave beam at those mutually coupled tracks and receive reflected signals therefrom. Similarly, antenna A2 is aligned with metamaterial tracks 55b and 56b, and, as such, is configured to transmit a mm-wave beam at those mutually coupled tracks and receive reflected signals therefrom.

As a result, different regions of metamaterial tracks can be arranged on the carrier structures and provide a different measurements. Preferably, the different regions at which the metamaterial tracks on a same carrier structure are attached are spaced in a way that the coupling between an inner rings and an outer ring is negligible compared to the coupling between the rings on the different carrier structures. For example, tracks 55a and 56a are strongly coupled by a field effect, whereas tracks 55a and 55b are weakly coupled or not coupled by a field effect. For this reason, tracks 55a and 56a may form a first coupled pair of tracks and tracks 55b and 56b may form a second coupled pair of tracks.

An antenna A1 or A2 is associated to each mutually coupled structure. Preferably the antennas A1 and A2 should have a directional characteristic that focusses their transmission and reception on the associated rings of the metamaterial structures. Thus, antenna A1 has a directional characteristic associated with tracks 55a and 56a (i.e., a first mutually coupled structure), and antenna A2 has a directional characteristic associated with tracks 55b and 56b (i.e., a second mutually coupled structure).

In case of identical patterns of elementary structures, the displacement of the elementary structures on both carrier structures will be different due to the different radius (d1=r1*da; d2=r2*da). Consequently, the change of the mm-wave property is lower on the inner track than on the outer track. In other words, a same angle shift of the shaft 54 causes a different change in the coupling of the two pairs of coupled tracks, resulting in two different signal modulations (i.e., amplitude and/or phase) in the receive signals generated by the different coupled pair of tracks.

The receiver circuit of transceiver 45 may then use a differential measurement to discriminate the applied torque which is more robust against external factors such as the influence of distance changes. For example, the receiver circuit may use signals received from the two mutually coupled structures to perform a differential measurement of the applied torque via a differential algorithm applied to the two signals.

Figure 5C:
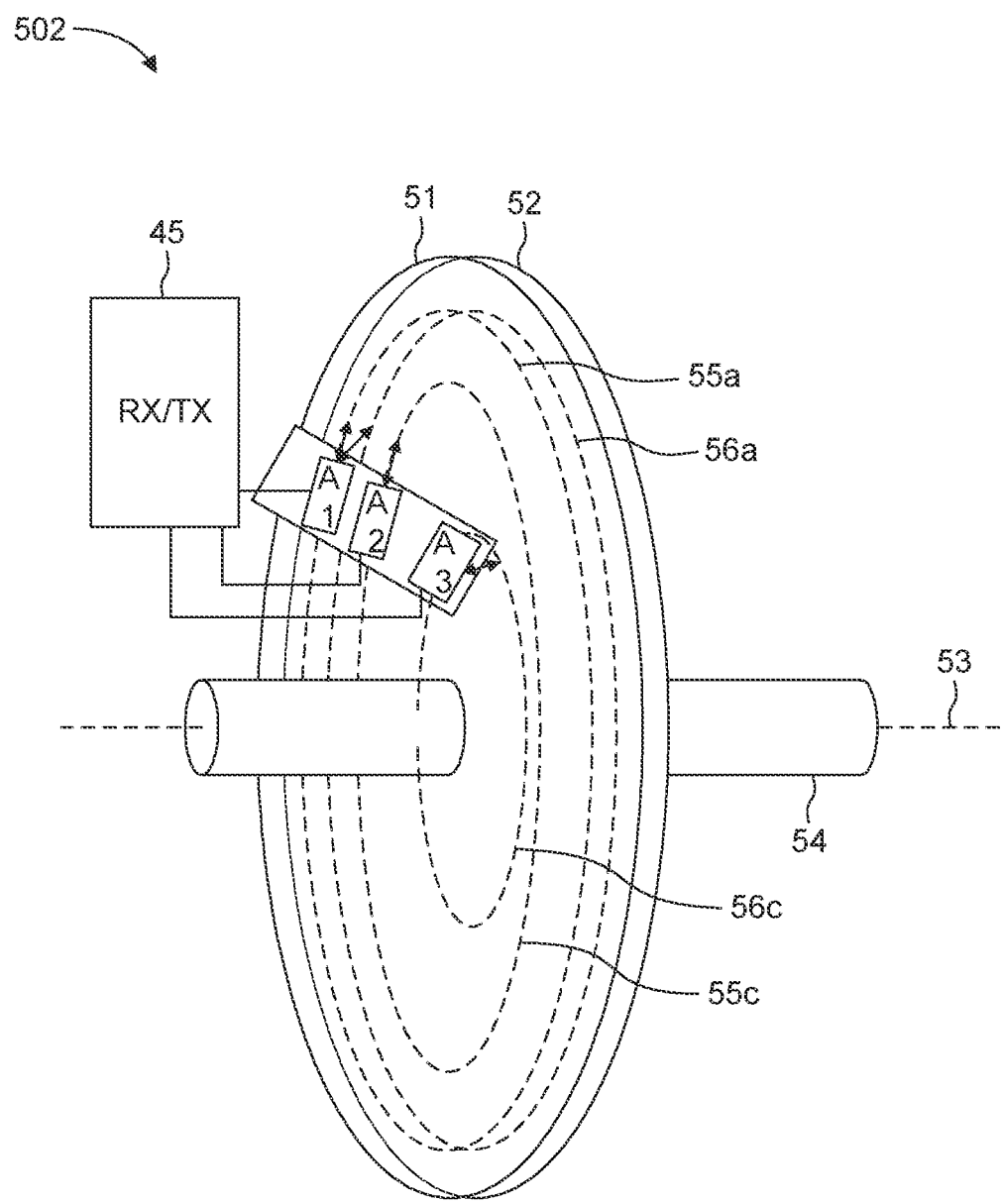
FIG. 5C is a schematic view of another torque measurement system according to one or more embodiments.

FIG. 5C is a schematic view of a torque measurement system 502 according to one or more embodiments. The torque measurement system 502 is similar to the torque measurement system 500 depicted in FIG. 5A, with the exception that the torque measurement system 502 includes additional metamaterial tracks on each rotatable target object 51 and 52. Two metamaterial tracks 55a and 55c are attached to rotatable target object 51 and two metamaterial tracks 56a and 56c are attached to rotatable target object 52. Thus, a single mutually coupled structure is formed by tracks 55a and 56a.

The two mm-wave metamaterial tracks 55a and 55c attached to rotatable target object 51 are concentric loops located at different distances from the rotational axis 53. Similarly, the two mm-wave metamaterial tracks 56a and 56c attached to rotatable target object 52 are concentric loops located at different distances from the rotational axis 53. Furthermore, tracks 55c and 56c are located at different distances from the rotational axis 53 such that mutual coupling therebetween is weak or zero.

This arrangement is similar to the torque measurement system 401 depicted in FIG. 5B, except the additional tracks 55c and 56c are not mutually coupled to each other or to any other track as is the case with tracks 55b and 56b. Instead, tracks 55c and 56c are reference metamaterial tracks for their respective target object (i.e., carrier structure) 51 or 52, may be used to determine an absolute angular position of its respective target object 51 or 52, or may be used to measure a rotational speed of its respective target object 51 or 52.

Tracks 55c and 56c may both have an array of structures that has at least one property that changes in the rotation direction, as explained above in reference to FIGS. 3A-3G. For example, a pattern of track 55c may have a 360°/N periodic change, where N is an integer greater than zero. Thus, track 55c may be configured to modify an electro-magnetic transmit signal as it rotates, thereby producing an electro-magnetic receive signal having a periodic change proportional to a rotational speed of target object 51. The periodic change may be a periodic change in amplitude or phase induced by the rotation of track 55c. As a result, the rate of periodic change, akin to a frequency is proportional to a rotational speed of track 55c that can be measured by the transceiver. A rate of change in measured angular values via track 55c could also be used to measure the rotational speed of track 55c. Track 56c may be used in a similar manner for measuring the rotational speed of its target object 52. The rotational speeds of tracks 55c and 56c are equal to the rotational speed of the shaft 54.

When N=1, the characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof. Since multiple of the metamaterial properties are changing simultaneously, multiple mm-wave parameters of a signal either transmitted, reflected, or emitted by a metamaterial track will depend on the rotational angle. Two or more mm-wave parameters of a same signal or of different signals may be evaluated simultaneously to discriminate the rotational position. Similarly, a single parameter of two or more signals may also be evaluated to discriminate the rotational position. Consequently, a measurement of all relevant variations can be used to improve the unambiguousness of the angle determination.

Here, three antennas A1, A2, and A3 are utilized, each having a directional characteristic that focusses their transmission and reception on the one or more associated rings of the metamaterial structures. Thus, antenna A1 has a directional characteristic associated with tracks 55a and 56a, antenna A2 has a directional characteristic associated with track 55c, and antenna A3 has a directional characteristic associated with track 56c.

Thus, there is an additional metamaterial track 55c, read by antenna A2, that is added on the front carrier structure 51 without a coupling track on the backside carrier structure 52, and an additional metamaterial track 56c, read by antenna A3, that is added to the backside carrier structure 52 without a coupling to the front side carrier structure 51. Consequently, the mm wave properties of those reference tracks 55c and 56c are not influenced by the displacement of the two carrier structures relative to each other due to mutual coupling and are therefore torque independent. Whereas, the mutual coupling between tracks 55a and 56a and the mutual coupling between tracks 55b and 56b, are torque dependent.

These reference tracks 55c and 56c can be used by the receiver circuit of the transceiver 45 as references for measurements that can be used to eliminate influences resulting from the setup, e.g., variations of the distance between the antennas and the distance between the two carrier structures 51 and 52.

For example, the receiver circuit of the transceiver 45 may be configured to determine a torque-independent absolute angular position of the carrier structure 51 by analyzing an amplitude modulation or a phase modulation of a receive signal received from track 55c at antenna A2 in reference to a carrier signal transmitted by the antenna A2 based on methods described above. The receiver circuit may use the torque-independent absolute angular position as the actual absolute angular position of the carrier structure 51, which may be further used to calculate the rotational speed thereof. Additionally, the receiver circuit may use the torque independent absolute angular position to detect preexisting errors in the set up and compensate the torque dependent measurements.

Similarly, the receiver circuit of the transceiver 45 may be configured to determine a torque independent absolute angular position of the carrier structure 52 by analyzing an amplitude modulation or phase modulation of a receive signal received from track 56c at antenna A3 in reference to a carrier signal transmitted by the antenna A3 based on methods described above. The receiver circuit may use the torque independent absolute angular position as the actual absolute angular position of the carrier structure 52, which may be further used to calculate the rotational speed thereof. Additionally, the receiver circuit may use the torque independent absolute angular position to detect preexisting errors in the set up and compensate the torque dependent measurements.

In addition, the torque independent structures may also be angle independent. For example, tracks 55c and 56c may have a homogeneous pattern, such as the one shown in FIG. 2A, with known behavior for the measurement of the distance between the track and the antenna.

Figure 6:
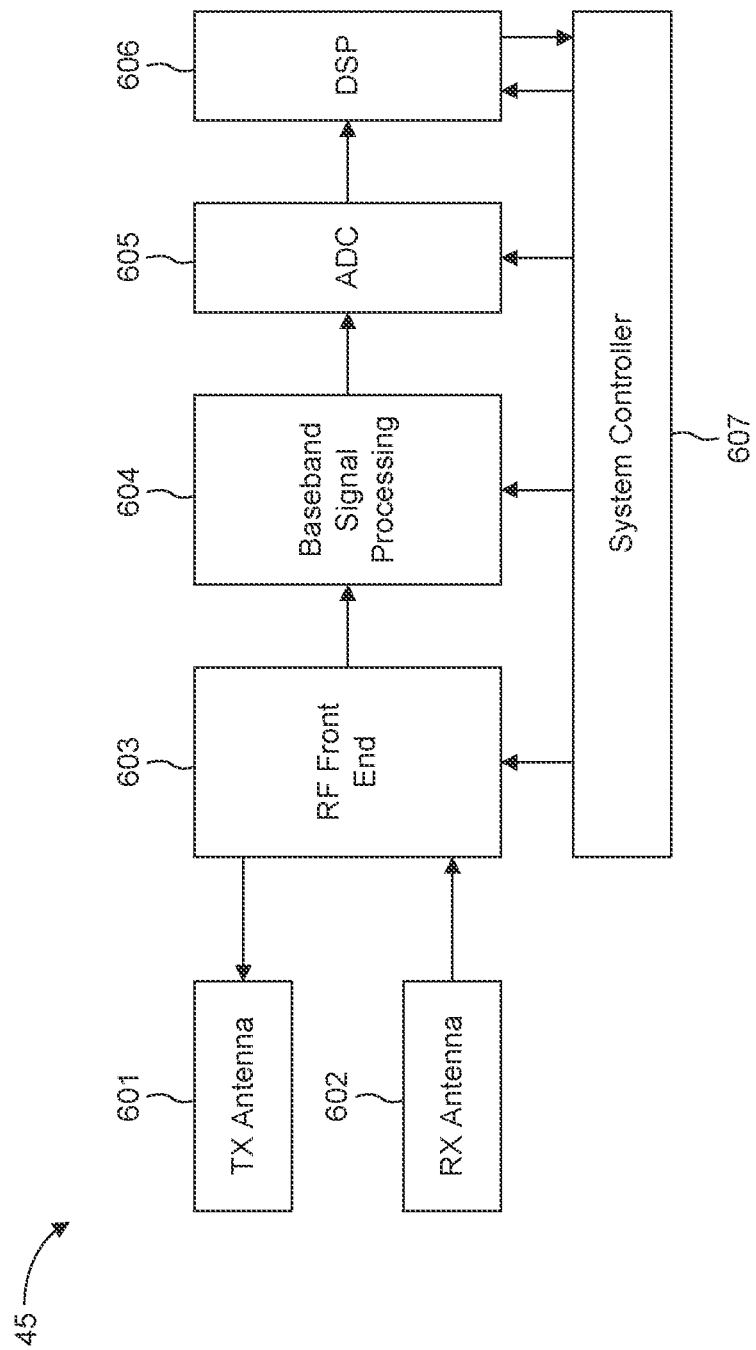
FIG. 6 is a block diagram that illustrates structure of one example of a transceiver according to one or more embodiments.

FIG. 6 is a block diagram that illustrates structure of one example of a transceiver according to one or more embodiments. The transceiver 45 includes relevant transmission circuitry and receiver circuitry to the embodiments described herein. It will also be appreciated that relevant transmission circuitry and receiver circuitry may be divided between the transmitter 45a and receiver 45b according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 601 (TX antenna) and at least one receiver antenna 602 (RX antenna) are connected to an RF front end 603 integrated into a chip, which the RF front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 603 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna 601 may be for example in the range of approximately 10 GHz to 500 GHz. However, the frequency bands that are applied here depend on the structures to be used for the generation of the metamaterial target. As mentioned, the RF signal received by the RX antenna 402 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 604). The analog signal processing circuitry 604 essentially comprises filtering and possibly amplifying the baseband signal. The baseband signal is finally digitized (see analog-to-digital converter 605) and processed further in the digital domain. The digital signal processing chain may be implemented at least partly in the form of software that is able to be executed on a processor, for example a microcontroller, a digital signal processor (DSP) 606, or another computer unit. The overall system is generally controlled by way of a system controller 607 that may likewise be implemented at least partly in the form of software that is able to be executed on a processor, such as for example a microcontroller. The RF front end 603 and the analog baseband signal processing chain 604 (optionally also the analog-to-digital converter 605) may be integrated together in a single MMIC (that is to say an RF semiconductor chip). As an alternative, the individual components may also be distributed over a plurality of integrated circuits. A single DSP may receive respective digital receive signals from each of the receive antennas for calculating rotational parameters of the rotatable shaft, including rotational speed, rotational direction, angle, torque, etc.

The DSP 606 is configured to perform the aforementioned phase analysis, amplitude analysis, and/or frequency analysis to determine a rotational parameter (e.g., rotational speed, rotational direction, absolute angular position, and/or torque) of the metamaterial track and/or the rotatable shaft based on the determined amplitude modulation and/or phase modulation. The phase modulation of a received signal may be a phase shift of the received signal with respect to a phase of the transmitted mm-wave (i.e., of the carrier signal). Similarly, the amplitude modulation of a received signal may be an amplitude shift of the received signal with respect to an amplitude of the transmitted mm-wave.

The DSP 606 may be configured to determine a phase shift and/or an amplitude shift of a received signal and translate the shift into a rotational parameter either directly from a single receive signal or in combination with another receive signal (e.g., two phase shifted receive signals are used to determine rotational direction). For example, the DSP 606 may refer to a look-up table provided in memory that stores angular positions or values relative to a specific amplitude modulation and/or phase modulation when the track has a 360° periodical pattern.

In addition, the DSP 606 may analyze a phase shift between two receive signals for determining an absolute angular position as described herein. The DSP 606 may also calculate the rotational speed by analyzing the rate of change in the angular values. Additionally, by obtaining two measurement signals (e.g., two 90° phase shifted signals), a rotation direction of the rotatable target object may also be determined by the DSP 606. In general, two receive signals can be used to achieve a 360° unambiguous measurement range. For a system measuring in a limited range the property of the metamaterial must not necessarily be changed according to a sine/cosine system. For a limited range (e.g., +/−60°), a sine alone would be sufficient.

Figure 7:
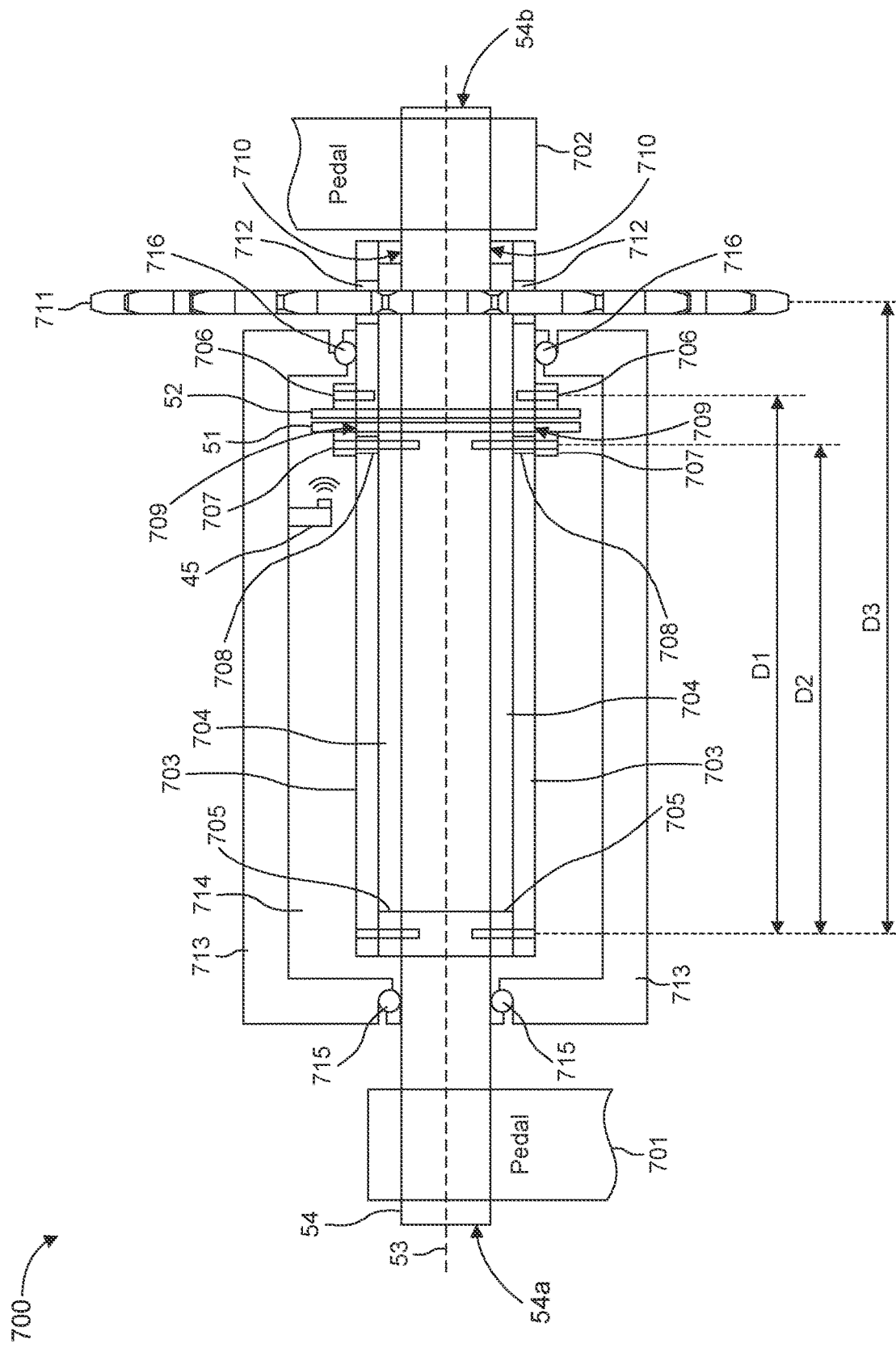
FIG. 7 illustrates a cross-sectional view of a torque measurement system of a pedelec according to one or more embodiments.

FIG. 7 illustrates a cross-sectional view of a torque measurement system 700 of a pedelec according to one or more embodiments. The torque measurement system 700 includes a transceiver 45, a first carrier structure 51 comprising one or more metamaterial tracks as shown in FIGS. 5A-5C, a second carrier structure 52 comprising one or more metamaterial tracks as shown in FIGS. 5A-5C, a rotational axis 53, and a center rotational shaft 54 (i.e., an inner rotational shaft) configured to rotation about the rotational axis 53. The center rotational shaft 54 includes a first end 54a to which a first pedal 701 is mechanically coupled and a second end 54b to which a second pedal 702 is mechanically coupled.

The torque measurement system 700 further includes an outer rotational shaft 703 configured to rotate about the rotational axis 53. Accordingly, the two shafts 54 and 703 share same rotational axis 53. The outer rotational shaft 703 is a hollow shaft having an interior volume 704. The center rotational shaft 54 is arranged in the interior volume 704 of the outer rotational shaft 703. Moreover, the outer rotational shaft 703 is mechanically coupled to the inner rotational shaft at a first coupling location via a first coupling structure 705. The first coupling structure 705 can be any type mechanical means of fastening, including any type of fastener or may be a metal coupling welded to both shafts 54 and 703. A rotation of the center rotational shaft 54 due to torque applied to one or both pedals 701 and 702 causes a rotation of the outer rotational shaft 703 via the first coupling structure 705.

It is noted that the mechanical stiffness of the center rotational shaft 54 is greater than the mechanical stiffness the outer rotational shaft 703. As a result of the different stiffnesses, when torque is applied to one or both of the pedals 701 and 702, the center rotational shaft 54 rotates by a different amount when compared to the rotation of the outer rotational shaft 703. In other words, one or more torques (e.g., the left torque from the left pedal 701 and/or the right torque from the right pedal 702) applied to the center rotational shaft 54 is translated into a torque-dependent angular shift between the center rotational shaft 54 and the outer rotational shaft 703 about the rotational axis 53. The amount of the angular shift is proportional to the amount of torque applied to the center rotational shaft 54. This torque-dependent angular shift is experienced between carrier structures 51 and 52 and ultimately between the metamaterial tracks 55 and 56 that can be measured for determining the total torque (i.e., the sum of the left toque and the right torque).

The carrier structure 52, and thus metamaterial track 56, is mechanically coupled to the outer rotational shaft 703 by a coupling structure 706 and is configured to co-rotate with the outer rotational shaft 703. Likewise, the carrier structure 51, and thus metamaterial track 55, is mechanically coupled to the center rotational shaft 54 by a coupling structure 707 and is configured to co-rotate with the center rotational shaft 54. The coupling structure 707 may extend through a through-hole 708 (e.g., borehole) that extends through the outer rotational shaft 703 in order to fix the carrier structure 51 to the center rotational shaft 54. The through-hole 708 is sized with enough play to allow the torque twist to freely occur between the two shafts 54 and 703.

In addition, the carrier structure 51 and part of the coupling structure 707 may rest on a sliding surface or bearing 709 arranged on the outer surface of the outer rotational shaft 703. The sliding surface or bearing 709 merely provides structural support to the carrier structure 51 and the coupling structure 707 while allowing them to rotate or twist relative to the outer rotational shaft 703. Similarly, the end of the outer rotational shaft 703 arranged opposite to the coupling structure 705 rests on a sliding surface or bearing 701 arranged on the outer surface of the center rotational shaft 54. Again, the sliding surface or bearing 710 merely provides structural support to the outer rotational shaft 703 while allowing it to rotate or twist relative to the center rotational shaft 54.

The torque measurement system 700 further includes a chain gear 711 that is mechanically coupled to the outer rotational shaft 703 via a coupling structure 712. Thus, a rotation of the outer rotational shaft 703 causes the chain gear 711 to rotate. As result of the mechanical arrangement of part, mechanical power applied to at least one of pedal 701 and pedal 702 is transferred to the chain gear 711 via a transmission path that propagates from the center rotational shaft 54, to coupling structure 705, to the outer rotational shaft 703, to coupling structure, 712, and finally to the chain gear 711. The torques applied to the pedals both contribute to the angular shift between shafts 54 and 703, the sum of which is measured by the transceiver 45.

The rotation of the center rotational shaft 54 causes a rotation of the chain gear 711 via coupling structure 705, the outer rotational shaft 703, and coupling structure 712.

The torque measurement system 700 further includes a frame 713 that houses components of the torque measurement system 700 within an interior volume 714. The frame 713 may be supported by bearings 715 and 716 that allow the shafts 54 and 703 to rotate while the frame 713 remains rotationally fixed. Bearings 715 are interposed between the frame 713 and the center rotational shaft 54 and bearings 716 are interposed between the frame 713 and the outer rotational shaft 703. The transceiver 45 may be fixed to an interior surface of the frame 713 in proximity to the metamaterial tracks 55 and 56.

The metamaterial tracks 55 and 56 are mutually coupled to each other by a torque dependent coupling, including at least one of capacitive near field coupling, inductive near field coupling, waveguide coupling, or far field coupling, thereby forming a mutually coupled structure, as described in references to FIGS. 5A-5C. The transceiver 45 is configured to transmit an electro-magnetic transmit signal towards the mutually coupled structure and the mutually coupled structure is configured to convert the electro-magnetic transmit signal into an electro-magnetic receive signal based on the torque-dependent angular shift present between metamaterial tracks 55 and 56. In other words, the electromagnetic transmit signal interacts with both tracks 55 and 56 to produce the electro-magnetic receive signal that depends on the torque-dependent angular shift. At least one feature (e.g., phase and/or amplitude) of the electro-magnetic transmit signal changes according to the angular shift to produce the electro-magnetic receive signal. The transceiver 45 is configured to receive the receive the electro-magnetic receive signal and determine the torque applied to the center rotational shaft 54 via one or both pedals 701 and 702.

For example, the torque-dependent angular shift affects an mm-wave property of the mutually coupled structure formed by tracks 55 and 56 such that the mm-wave property changes based on torque or torques applied to the center rotational shaft 54. As a result, the mutually coupled structure formed by tracks 55 and 56 is configured to modify the electromagnetic transmit signal based on the torque-dependent angular shift, thereby producing the electro-magnetic receive signal having a property unique to the total amount of torque applied to the center rotational shaft 54. The unique property may be a phase shift amount or amplitude shift amount that is unique to the amount of torque. The transceiver 45 includes at least one processor (e.g., DSP 606) configured to determine the torque applied to the center rotational shaft 54 from one or both pedals based on the electro-magnetic receive signal by evaluating the phase or amplitude relative to the phase or amplitude of the transmitted signal.

The determined torque may be a total torque represented by a sum of the first torque applied by a first pedal 701 and the second torque applied by a second pedal 702, where the at least one processor is configured to determine the summed torque based on the received electro-magnetic receive signal. Alternatively, a first portion of the determined at least one torque may be attributed substantially to the first torque and a second portion of the of the determined at least one torque may be attributed nominally to the second torque. Alternatively, the determined at least one torque may be an intermixing of the first torque and the second torque, with a certain known percentage of the measured torque attributed to the first torque and a certain known percentage of the measured torque attributed to the second torque, where the percentages are different. The received first electro-magnetic receive signal may be representative of (e.g., proportional to) the total torque, the first torque, or the second torque. Thus, the at least one processor may be configured to determine the total torque, the first torque, or the second torque based on the received electro-magnetic receive signal.

It is further noted that the coupling location of coupling structure 706 is spaced apart from the coupling location of coupling structure 705 in a lateral direction by a first lateral distance D1. The lateral direction extends parallel to the rotation axis 53 (i.e., parallel to an axial direction of the center rotational shaft 54). In contrast, the radial direction is orthogonal to the axial direction. The coupling location of coupling structure 707 is spaced apart from the coupling location of coupling structure 705 in the lateral direction by a second lateral distance D2 that is different from the first lateral distance D1. The coupling location of coupling structure 712 is spaced apart from the coupling location of coupling structure 705 in the lateral direction by a third lateral distance D3 and the coupling locations of coupling structures 706 and 707 are located laterally between the coupling locations of coupling structures 705 and 712.

One or both of the carrier structures 51 or 52 may further include an additional metamaterial track (e.g., track 55c and/or 56c) used to measure a pedal frequency (i.e., a pedal rotational speed) or the rotational speed of the center rotational shaft 54.

The transceiver 45 is configured to transmit a second electro-magnetic transmit signal to one of the additional tracks 55c or 56c, and the additional metamaterial track is arranged to convert the second electro-magnetic transmit signal into a second electro-magnetic receive signal. The additional metamaterial track 55c or 56c is configured to modify the second electro-magnetic transmit signal, thereby producing the second electro-magnetic receive signal having a periodic change proportional to a rotational speed of the center rotational shaft 54 or the outer rotational shaft 703, respectively, and the DSP 606 is configured to measure the periodic change of the second electro-magnetic receive signal and determine the rotational speed of the center rotational shaft 54 or the outer rotational shaft 703 based on the periodic change. For example, the periodic change may be a phase shift or an amplitude shift that changes in a periodic manner. The frequency of the phase shift of amplitude shift is proportional to the rotational speed that can be measured by the DSP 606.

Figure 8:
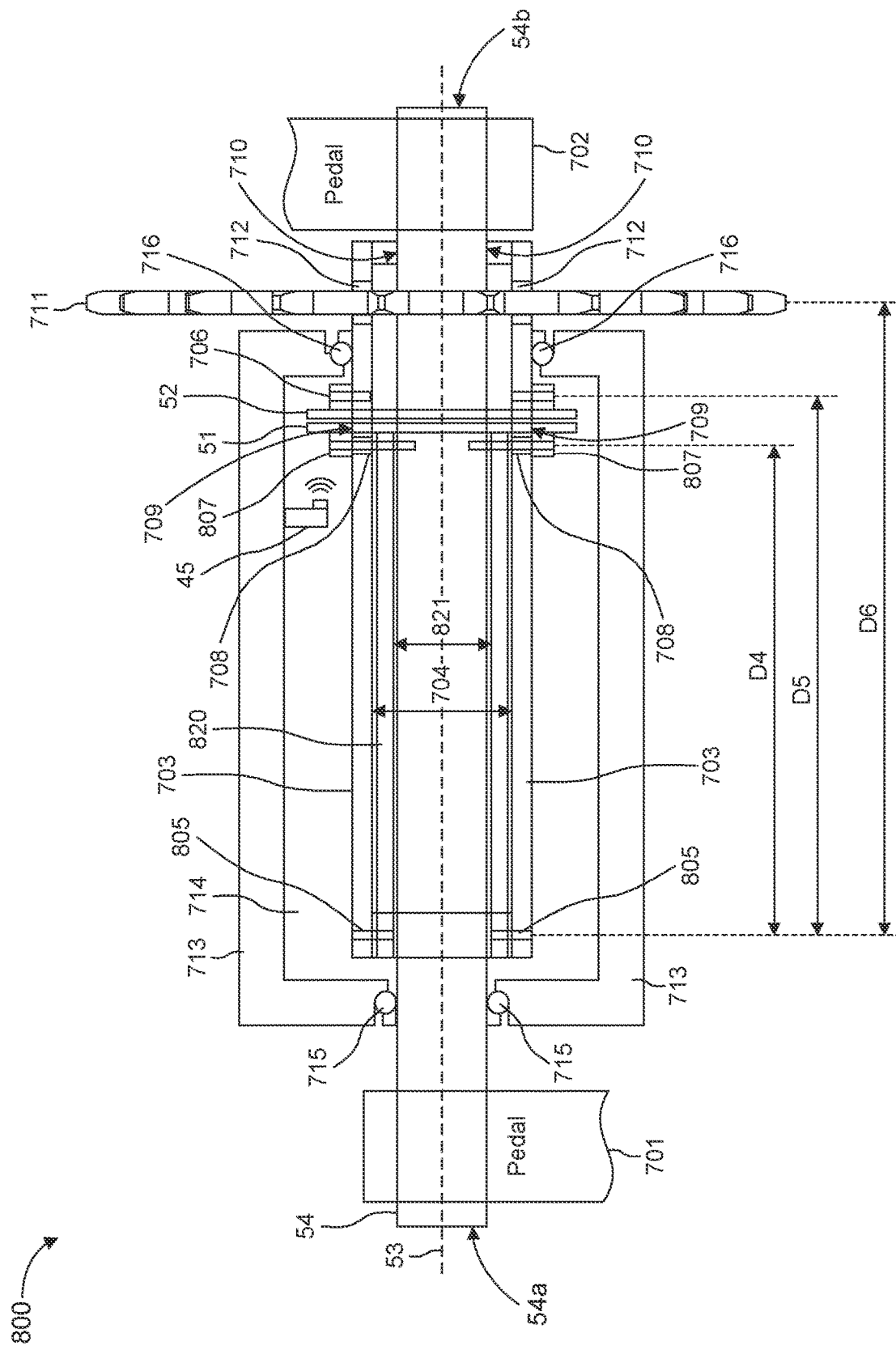
FIG. 8 illustrates a cross-sectional view of another torque measurement system of a pedelec according to one or more embodiments.

FIG. 8 illustrates a cross-sectional view of a torque measurement system 800 of a pedelec according to one or more embodiments. The torque measurement system 800 is similar to torque measurement system 700 with the exception that it includes two hollow rotational shafts in addition to the center rotational shaft and arrangement of the coupling structures are different. Thus, the power transmission path from the pedals 701 and 702 to the chain gear 711 is also different.

The torque measurement system 800 includes an outer hollow rotational shaft 703 having a first interior volume 704 and configured to rotate about the rotational axis 53 and an inner hollow rotational shaft 820 having a second interior volume 821 and arranged in the first interior volume 704, where the inner hollow rotational shaft 820 is also configured to rotate about the rotational axis. The torque measurement system 800 further includes the center rotational shaft 54 arranged in the second interior volume 821. The inner hollow rotational shaft 820 is mechanically coupled to the center rotational shaft 54 at a first coupling location via a first coupling structure 807. As a result of the coupling via the first coupling structure 807, a rotation of the center rotational shaft 54 causes a rotation of the inner hollow rotational shaft 820.

Additionally, the outer hollow rotational shaft 703 is mechanically coupled to the inner hollow rotational shaft 820 at a second coupling location via a second coupling structure 805, where the rotation of the inner hollow rotational shaft 820 causes a rotation of the outer hollow rotational shaft 703 via the second coupling structure 805. The two coupling structures 805 and 807 and the stiffness differential between shafts, enable the torques applied to the center rotational shaft 54 to be translated into a torque-dependent angular shift between the outer hollow rotational shaft 703 and the center rotational shaft 54 that can be measured by the transceiver 45.

It is to be further noted that the carrier structure 51, and thus metamaterial track 55, is mechanically coupled to both the center rotational shaft 54 and the inner hollow rotational shaft 820 via the first coupling structure 807 and is configured to co-rotate with the center rotational shaft and the inner hollow rotational shaft. The coupling structure 807 may extend through a through-hole 708 (e.g., borehole) that extends through the outer hollow rotational shaft 703 in order to fix the carrier structure 51 to the center rotational shaft 54. The through-hole 708 is sized with enough play to allow the torque twist to freely occur between shafts 54 and 703.

Carrier structure 52, and thus metamaterial track 56, is mechanically coupled to the outer hollow rotational shaft 703 at a third coupling location via a third coupling structure 706 and is configured to co-rotate with the outer hollow rotational shaft 703.

The first coupling location of the first coupling structure 807 is spaced apart from the second coupling location of the second coupling structure 805 in the lateral direction by a lateral distance D4. The third coupling location of a third coupling structure 706 is spaced apart from the second coupling location of the second coupling structure 805 in the lateral direction by a lateral distance D5 that is different from the lateral distance D4.

The chain gear 711 is mechanically coupled to the outer hollow rotational shaft 703 at a fourth coupling location via a fourth coupling structure 712 and is configured to rotate about the rotational axis 53. The rotation of the center rotational shaft 54 causes a rotation of the chain gear 711 via the first coupling structure 807, the second coupling structure 805, the fourth coupling structure 712, and the two hollow shafts 820 and 703. The fourth coupling location of the fourth coupling structure 712 is spaced apart from the second coupling location of the second coupling structure 805 in the lateral direction by a lateral distance D6. The first coupling structure 807 and the third coupling structure 706 are located laterally between the second and the fourth coupling structures 805 and 712.

The mechanical power applied to one or both pedals 701 and 702 is transferred to the chain gear 711 via a transmission path that propagates from the center rotational shaft 54, to the first coupling structure 807, to the inner hollow rotational shaft 820, to the second coupling structure, 805, to the outer hollow rotational shaft 703, to the fourth coupling structure 712, and finally to the chain gear.

Figure 9:
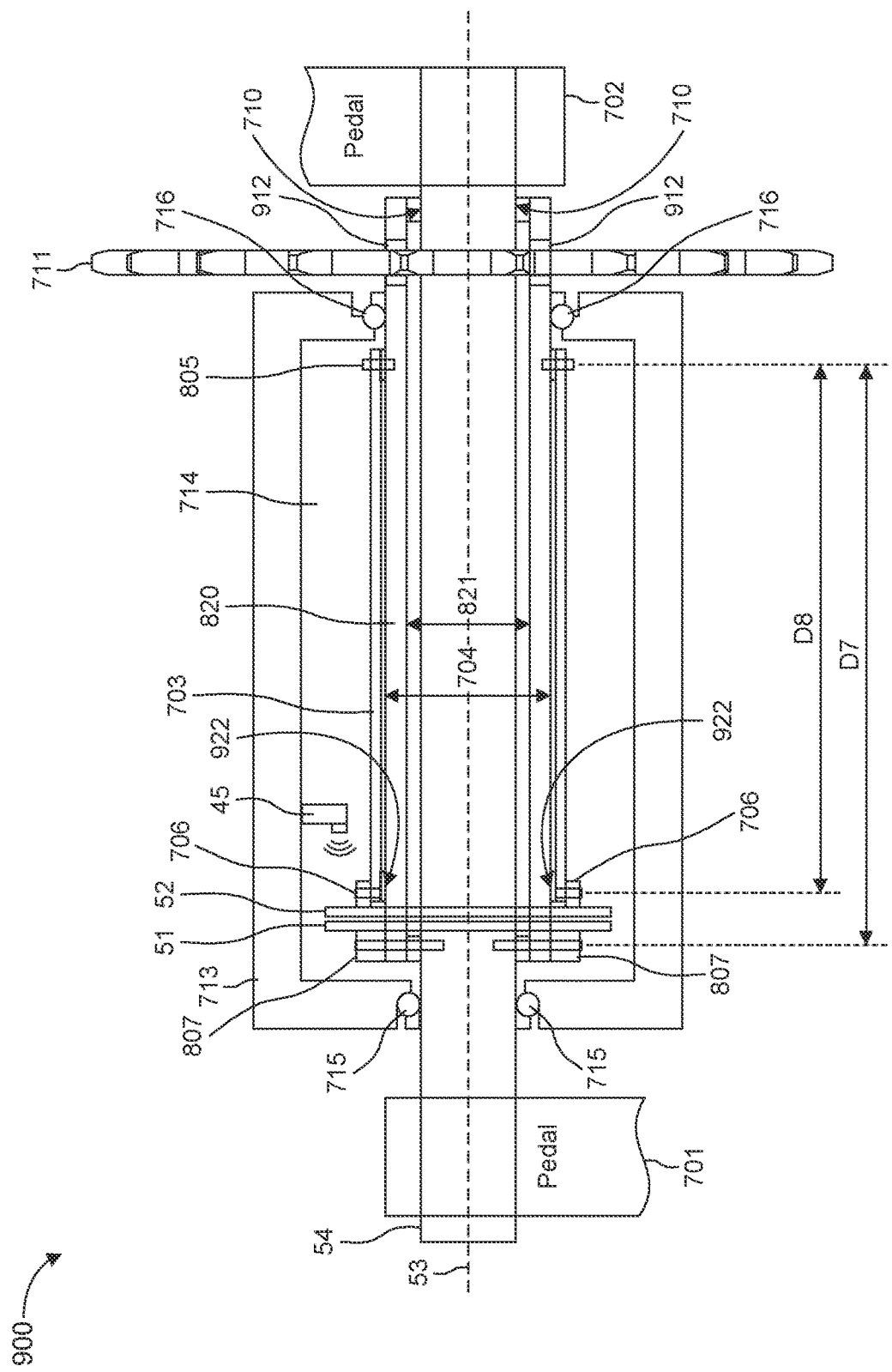
FIG. 9 illustrates a cross-sectional view of another torque measurement system of a pedelec according to one or more embodiments.

FIG. 9 illustrates a cross-sectional view of a torque measurement system 900 of a pedelec according to one or more embodiments. The torque measurement system 900 is similar to torque measurement system 800 with the exception that the arrangement of the coupling structures is different, including the chain gear 711 being mechanically coupled to the inner hollow rotational shaft 820 instead of the outer hollow rotational shaft 703. The coupling arrangement also does not require the use of a through-hole 708 through the outer hollow rotational shaft 703.

The torque measurement system 900 includes an outer hollow rotational shaft 703 having a first interior volume 704, an inner hollow rotational shaft 820 having a second interior volume 821 and arranged in the first interior volume 704, and a center rotational shaft 54 arranged in the second interior volume 821. The inner hollow rotational shaft 820 is mechanically coupled to the center rotational shaft 54 at a first coupling location via a first coupling structure 807, where a rotation of the center rotational shaft 54 causes a rotation of the inner hollow rotational shaft 820 via the first coupling structure 807. The outer hollow rotational shaft 703 is mechanically coupled to the inner hollow rotational shaft 820 at a second coupling location via a second coupling structure 805, where the rotation of the inner hollow rotational shaft 820 causes a rotation of the outer hollow rotational shaft 703 via the second coupling structure 705. The end of the outer hollow rotational shaft 703 arranged opposite to coupling structure 805 is supported on an outer surface of the inner hollow rotational shaft 820 via a sliding surface or bearing 922.

The two coupling structures 805 and 807 and the elasticity of shaft 820, enable the torques applied to the center rotational shaft 54 to be translated into a torque-dependent angular shift between the outer hollow rotational shaft 703 and the center rotational shaft 54 that can be measured by the transceiver 45.

It is to be further noted that the carrier structure 51, and thus metamaterial track 55, is mechanically coupled to both the center rotational shaft 54 and the inner hollow rotational shaft 820 via the first coupling structure 807 and is configured to co-rotate with the center rotational shaft and the inner hollow rotational shaft. Carrier structure 52, and thus metamaterial track 56, is mechanically coupled to the outer hollow rotational shaft 703 at a third coupling location via a third coupling structure 706 and is configured to co-rotate with the outer hollow rotational shaft 703.

The second coupling location of the second coupling structure 805 is spaced apart from the first coupling location of the first coupling structure 807 in a lateral direction by a lateral distance D7. The third coupling location of the third coupling structure 706 is spaced apart from the first coupling location in the lateral direction by a lateral distance D8 that is less than the lateral distance D7.

The chain gear 711 is mechanically coupled to the inner hollow rotational shaft 820 at a fourth coupling location via a fourth coupling structure 912, where the rotation of the center rotational shaft 54 causes a rotation of the chain gear 711 via the first coupling structure 807 and the fourth coupling structure 912. The fourth coupling structure 912 can be any fastener that enables the chain gear to co-rotate with the inner hollow rotational shaft 820 and may be a freewheel in one example.

The mechanical power applied to at least one of the first pedal 701 and the second pedal 702 is transferred to the chain gear 711 via a transmission path that propagates from the center rotational shaft 54, to the first coupling structure 807, to the inner hollow rotational shaft 820, to the fourth coupling structure 912, and finally to the chain gear 711.

Figure 10A:
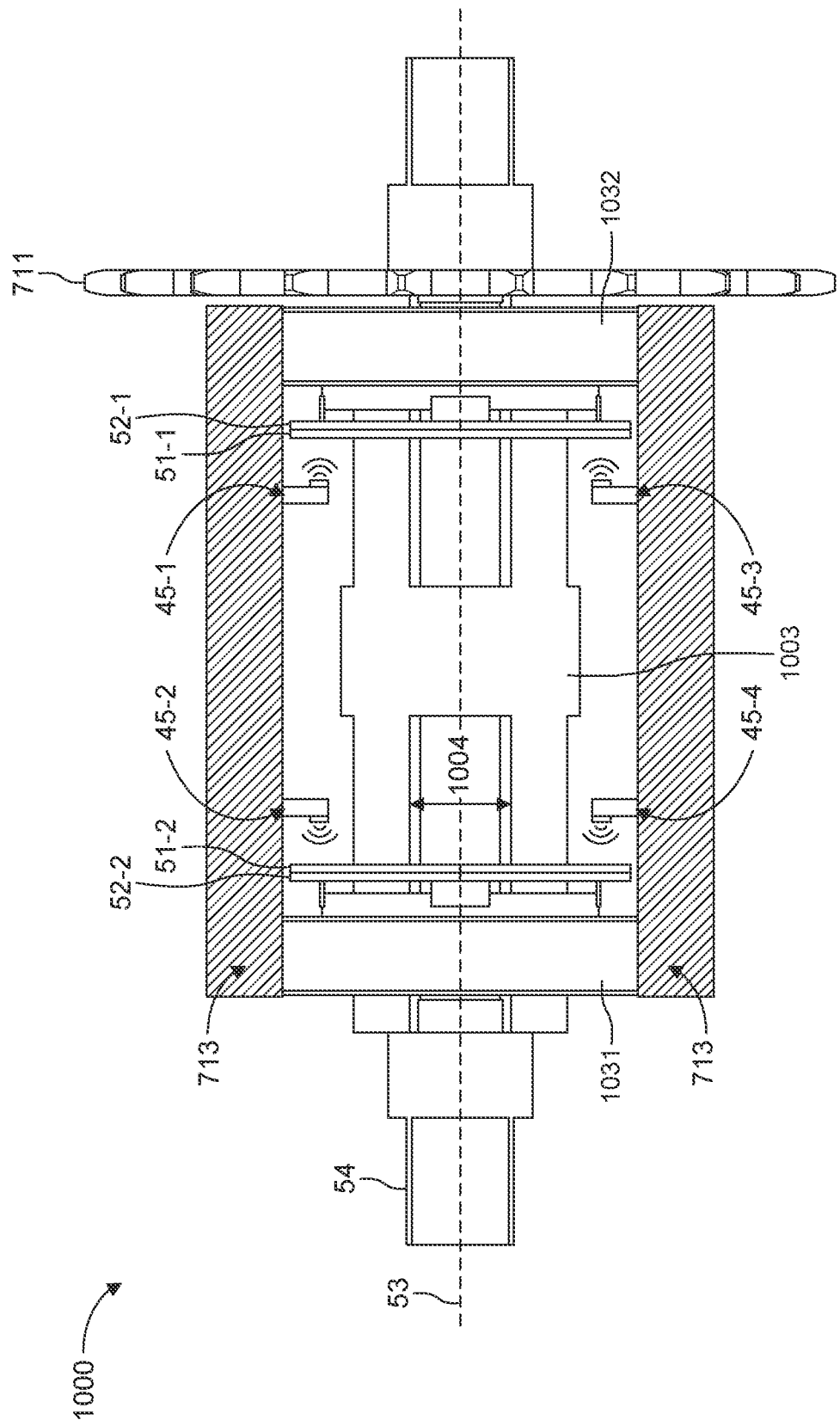
FIGS. 10A-10C illustrate a various views of another torque measurement system of a pedelec according to one or more embodiments.
Figure 10B:
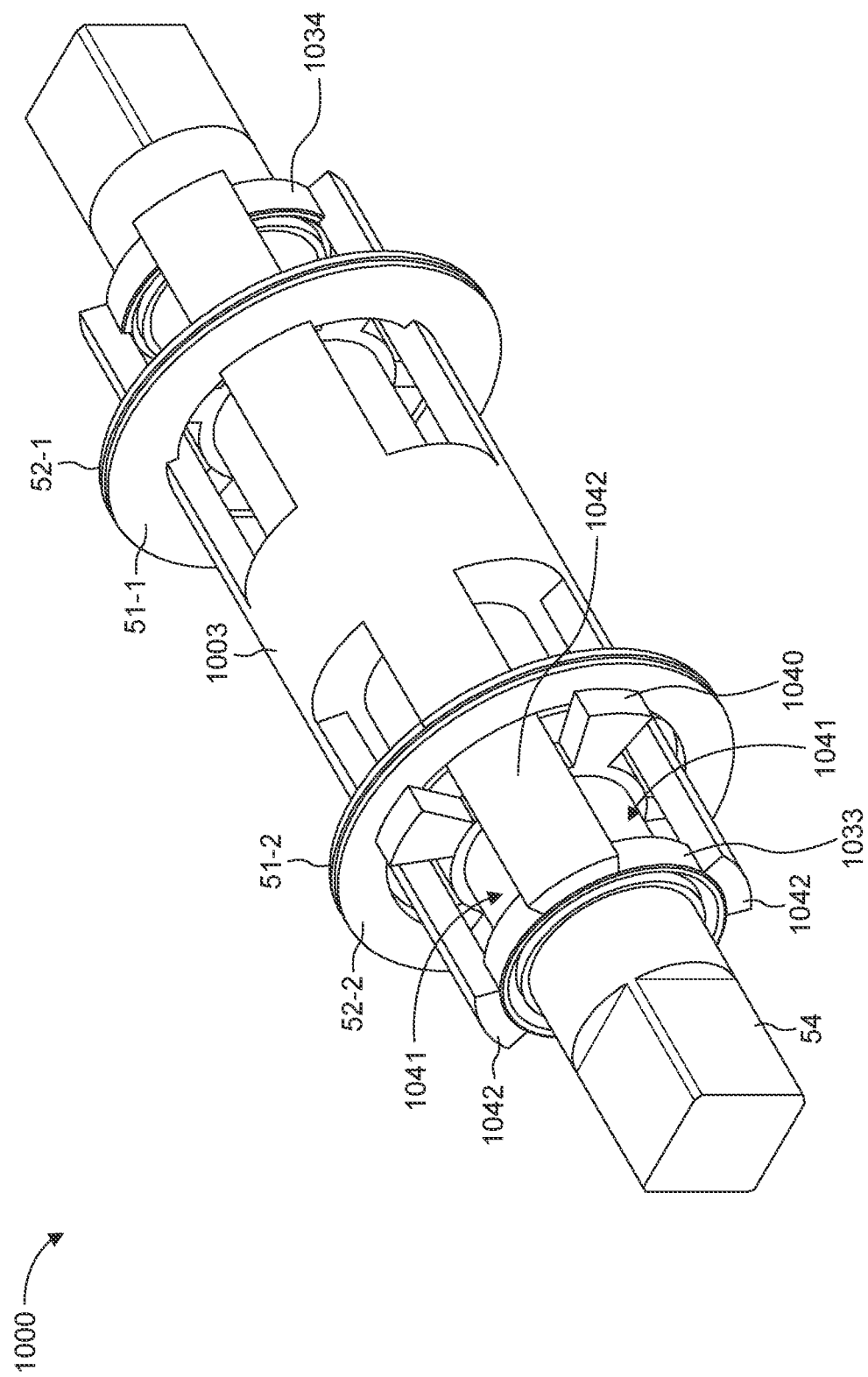
Figure 10C:
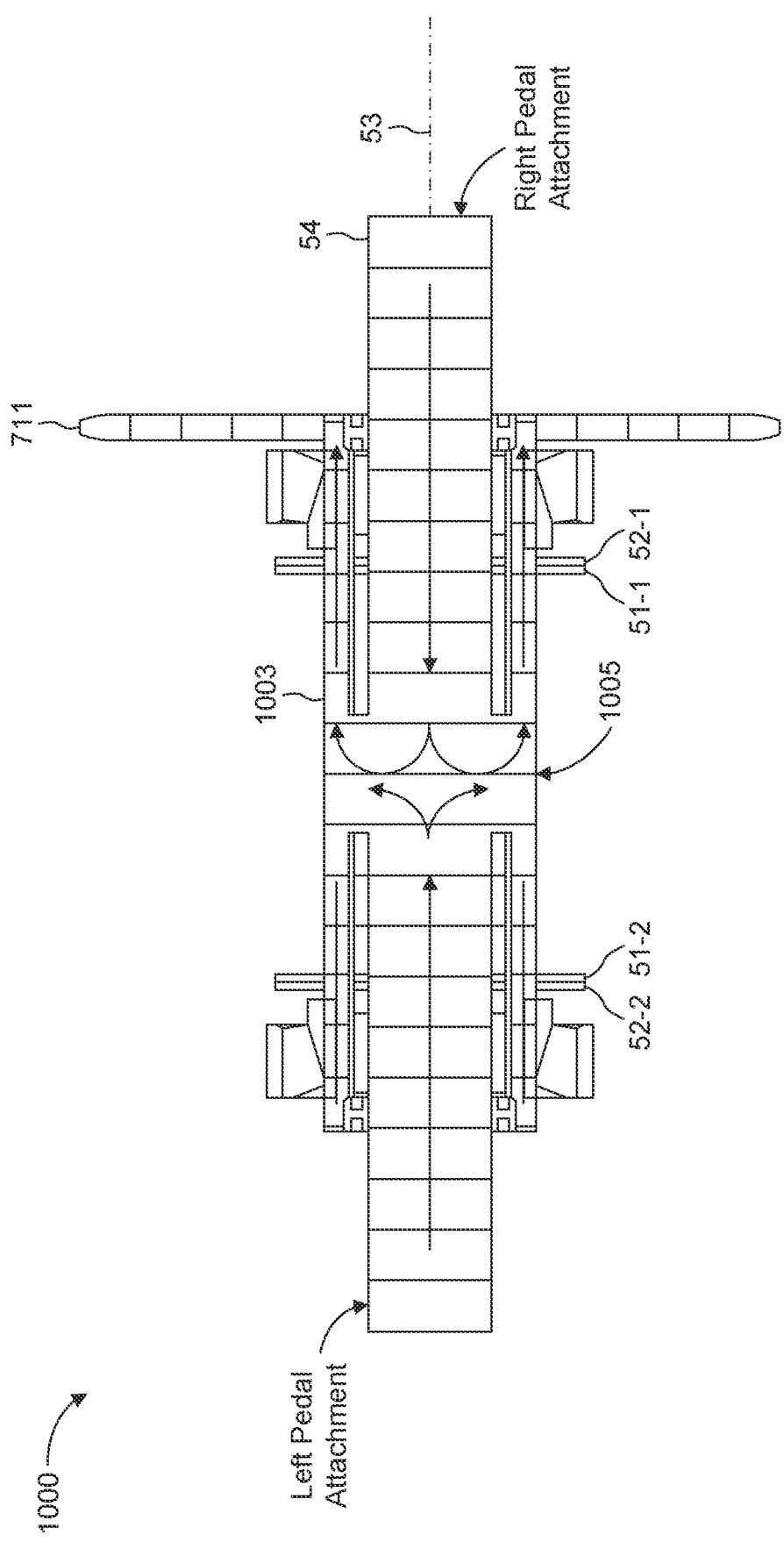

FIGS. 10A-10C illustrate various views of a torque measurement system 1000 of a pedelec according to one or more embodiments. FIG. 10A illustrates a cross-section view, FIG. 10B illustrates a side perspective view, and FIG. 10C illustrates a top perspective view. The torque measurement system 1000 includes an outer hollow rotational shaft 1003 and a center rotational shaft 54 (i.e., a center rotational shaft). The outer hollow rotational shaft 1003 and the center rotational shaft 54 are configured to rotate about rotational axis 53. The outer hollow rotational shaft 1003 has an interior volume 1004 inside of which the center rotational shaft 54 is arranged. The center rotational shaft 54 is mechanically coupled to left and right pedals (not illustrated). A chain gear 711 that is mechanically coupled to the outer hollow rotational shaft 1003 is also provided.

The torque measurement system 1000 includes two pairs of carrier structures that each have respective metamaterial tracks arranged thereon, as similarly described above in reference to FIGS. 5A-5C and 7. The first pair of carrier structures are arranged proximate to one end of the system near, for example, the right pedal and includes carrier structures 51-1 and 52-1 (arranged similar to carrier structures 51 and 52) with carrier structure 51-1 mechanically coupled to the outer hollow rotational shaft 1003 and carrier structure 52-1 mechanically coupled to the center rotational shaft 54. A metamaterial track of carrier structure 51-1 and a metamaterial track of carrier structure 52-1 are mutually coupled to each other by a torque dependent coupling, thereby forming a mutually coupled structure (e.g., formed by a respective pair of tracks 55 and 56). The second pair of carrier structures are arranged proximate to the other end of the system near, for example, the left pedal and includes carrier structures 51-2 and 52-2 (arranged similar to carrier structures 51 and 52) with carrier structure 51-2 mechanically coupled to the outer hollow rotational shaft 1003 and carrier structure 52-2 mechanically coupled to the center rotational shaft 54. A metamaterial track of carrier structure 51-2 and a metamaterial track of carrier structure 52-2 are mutually coupled to each other by a torque dependent coupling, thereby forming a mutually coupled structure (e.g., formed by a respective pair of tracks 55 and 56). Additional metamaterial tracks may be included for measuring pedal frequency (i.e., a pedal rotational speed) or the rotational speed of the center rotational shaft 54, as similarly discussed above.

Two transceivers 45-1 and 45-2 are provided with each one being associated with one of the mutually coupled structures of metamaterial tracks. Transceiver 45-1 is configured to transmit electro-magnetic transmit signals at the tracks of carrier structures 51-1 and 52-1 and receive electro-magnetic receive signals therefrom for measuring torque and pedal frequency. Transceiver 45-2 is configured to transmit electro-magnetic transmit signals at the tracks of carrier structures 51-2 and 52-2 and receive electro-magnetic receive signals therefrom for measuring torque and pedal frequency. Optional transceivers 45-3 and 45-4 may also be provided with each one being associated with one of the mutually coupled structures of metamaterial tracks.

External bearings 1031 and 1032 are provided to support the outer hollow rotational shaft 1003 and the center rotational shaft 54 within a frame 713 while enabling the free rotation thereof. The transceivers 45-1 and 45-2 are fixed to an interior surface of the frame 713 in proximity to their respective metamaterial tracks.

FIG. 10B shows that the outer hollow rotational shaft 1003 includes finger structures 1042 that extend in the axial direction and that define a plurality of recesses 1041 therebetween. An inner disc holder 1040 is mechanically fixed to the center rotational shaft 54 and is configured to co-rotate therewith. The inner disc holder 1040 includes protrusions that extend in the radial direction through a corresponding one of the recesses 1041. The protrusions are configured to mechanically engage with the finger structures 1042 to transfer rotational power from the center rotational shaft 54 to the outer hollow rotational shaft 1003. The recesses 1041 are dimensioned large enough to allow a torque-dependent angular shift to occur between the outer hollow rotational shaft 1003 and the center rotational shaft 54 under load. Applied torques on the pedals is then translated into the torque-dependent angular shift between the two metamaterial tracks of each pair of tracks.

The shift angle on the side facing the chain gear 711 is slightly larger than that on the opposite side of the sensor system since power transmission in the outer hollow rotational shaft 1003 only occurs at the side facing the chain gear 711. This causes an additional small shift angle from small deformations in the finger like structures 1042 of the outer hollow rotational shaft 1003. This is considered in the computation of the applied torque.

Inner bearings 1033 and 1034 can also be seen in FIG. 10B. The inner bearings 1033 and 1034 are interposed between the center rotational shaft 54 and the outer hollow rotational shaft 1003 and are configured to support the outer hollow rotational shaft 1003 on the center rotational shaft 54 while enabling the rotation of the outer hollow rotational shaft 1003 about the rotational axis 53. The inner bearings 1033 and 1034 also suppress vibrations. Elastic rings can also be used here for mechanical dampening. It is also possible to omit the bearings and measure with multiple transceivers at multiple points on the metamaterial discs or at opposing sides of the rotational axis 53, as shown in FIG. 10A. Here, transceiver 45-3 performs an additional measurement on the mutually coupled tracks (e.g., tracks 55 and 56) of carrier structures 51-1 and 52-1 and the measurement is used to compensate for vibrations. Similarly, transceiver 45-4 performs an additional measurement on the mutually coupled tracks (e.g., tracks 55 and 56) of carrier structures 51-2 and 52-2 and the measurement is used to compensate for vibrations. Vibrations are then compensated for in signal processing via one or more of the DSPs.

FIG. 10C is a top cross-sectional view used to show a power transmission path from both pedals to the chain gear 711 in response to torque applied to the pedals. The cross-section is taken along the rotational axis. In this view, a mechanical coupling 1005 between the center rotational shaft 54 and the outer hollow rotational shaft 1003 can be seen where the two shafts are conjoined.

The power transmission path starts at each of the pedals at the ends of the center rotational shaft 54 and propagates inward through the center rotational shaft 54 to the mechanical coupling 1005 where the power is transferred to the outer hollow rotational shaft 1003. The power transmission path then continues along the outer hollow rotational shaft 1003 to the chain gear 711, which rotates based on the transfer of power from the pedals to the center rotational shaft 54 to the outer hollow rotational shaft 1003. The center rotational shaft 54 is only indirectly coupled to the chain gear 711 via this power transmission path, where a rotation of the center rotational shaft 54 causes a rotation of the chain gear 711 via this power transmission path.

Using two pairs of mutually coupled metamaterial tracks for torque measurement at opposite ends of the shaft 54 allows the system 1000 to estimate the applied torque on both pedals which is used for dynamic motor control.

The torque-dependent angular shift between carrier structures 51-1 and 52-1 is different than the torque-dependent angular shift between carrier structures 51-2 and 52-2. As noted above, shift angle between carrier structures 51-1 and 52-1 proximate the chain gear 711 is slightly larger than that of the shift angle between carrier structures 51-2 and 52-2 since power transmission in the outer hollow rotational shaft 1003 only occurs at the side facing the chain gear 711. Moreover, the torque-dependent angular shift between carrier structures 51-1 and 52-1 corresponds to the torque applied to the left pedal and to the right pedal, but the torque-dependent angular shift between carrier structures 51-2 and 52-2 corresponds to the torque applied to the left pedal only. As a result, the transceiver 45-1 that targets carrier structures 51-1 and 52-1 measures the torque applied by the right pedal via the torsion of the right half of shaft 54 plus the torsion of the right half of shaft 1003 and the torque applied by the left pedal via the torsion of the right half of shaft 1003. Additionally, the transceiver 45-2 that targets carrier structures 51-2 and 52-2 measures the torque applied only by the left pedal via the torsion of the left half of shaft 54.

Transceiver 45-1 may be configured to determine the torque-dependent angular shift between carrier structures 51-1 and 52-1 based on a corresponding electro-magnetic receive signal, transceiver 45-2 may be configured to determine the torque-dependent angular shift between carrier structures 51-2 and 52-2 based on a corresponding electro-magnetic receive signal, and a central or master processor or separate processors may determine the left torque and the right torque applied to the center rotational shaft based on the two torque-dependent angular shifts. From the measurement results from transceivers 45-1 and 45-2, the total torque applied to the right and left pedals can be calculated, as well as the individual contributions from left and right pedal, if the stiffnesses of shafts 54 and 1003 and the sensitivities of transceivers 45-1 and 45-2 on torsion are known. The central processor may also be configured to separate the left torque from the right torque out of the two torsion measurement results, if the stiffness relation between shafts 54 and 1003 are known. For example, if one shaft is known to be X times stiffer than the other shaft (i.e., ratio X:1), then the two torques can be calculated based on this ratio. Thus, from the measurement results of the two transceivers 45-1 and 45-2, both the sum of the left and right torques as well as the individual left and right torques can be calculated using the known stiffness relation.

For example, a first torque may be applied by a first pedal and a second torque may be applied by a second pedal and the received first electro-magnetic receive signal may be representative of (e.g., proportional to) the first torque and the received second electro-magnetic receive signal may be representative of (e.g., proportional to) the second torque. The received first electro-magnetic receive signal may be affected by an intermixing of the first torque and the second torque, where the received first electro-magnetic receive signal is attributed substantially to the first torque, with a certain known percentage of the measured torque attributed to the first torque and a certain known nominal percentage of the measured torque attributed to the second torque, where the percentages are different but are a function of a stiffness relation between shafts. In some cases, the exact percentages are not known but the portion of the second torque affecting the first electro-magnetic transmit/receive signal is understood to be nominal and can be ignored for determining the first torque from the first electro-magnetic receive signal. Likewise, the received second electro-magnetic receive signal may be affected by an intermixing of the first torque and the second torque, where the received second electro-magnetic receive signal is attributed substantially to the second torque, with a certain known percentage of the measured torque attributed to the second torque and a certain known nominal percentage of the measured torque attributed to the first torque, where the percentages are different but are a function of a stiffness relation between shafts. In some cases, the exact percentages are not known but the portion of the first torque affecting the second electro-magnetic transmit/receive signal is understood to be nominal and can be ignored for determining the second torque from the second electro-magnetic receive signal.

Additional embodiments are provided below.

1. A torque measurement system, comprising:
an outer rotational shaft configured to rotate about a rotational axis, wherein the outer rotational shaft is a hollow shaft having an interior volume;
an inner rotational shaft arranged in the interior volume of the outer rotational shaft and configured to rotate about the rotational axis,
wherein the outer rotational shaft is mechanically coupled to the inner rotational shaft at a first coupling location via a first coupling structure, wherein a rotation of the inner rotational shaft causes a rotation of the outer rotational shaft via the first coupling structure,
wherein at least one torque applied to the inner rotational shaft is translated into a first torque-dependent angular shift between the inner rotational shaft and the outer rotational shaft about the rotational axis;
a first metamaterial track mechanically coupled to the outer rotational shaft and configured to co-rotate with the outer rotational shaft, wherein the first metamaterial track is arranged at least partially around of the rotational axis, and wherein the first metamaterial track comprises a first array of elementary structures;
a second metamaterial track mechanically coupled to the inner rotational shaft and configured to co-rotate with the inner rotational shaft, wherein the second metamaterial track is arranged at least partially around the rotational axis, and wherein the second metamaterial track comprises a second array of elementary structures,
wherein the first metamaterial track and the second metamaterial track are mutually coupled to each other by a first torque dependent coupling, thereby forming a first mutually coupled structure;
at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and
at least one first receiver configured to receive the first electro-magnetic receive signal.

2. The torque measurement system of embodiment 1, wherein:
the first metamaterial track is mechanically coupled to the outer rotational shaft at a second coupling location via a second coupling structure, wherein the second coupling location is spaced apart from the first coupling location in a lateral direction by a first lateral distance, and the second metamaterial track is mechanically coupled to the inner rotational shaft at a third coupling location via a third coupling structure, wherein the third coupling location is spaced apart from the first coupling location in the lateral direction by a second lateral distance that is different from the first lateral distance.

3. The torque measurement system of embodiment 2, further comprising:

a first pedal coupled to a first end of the inner rotational shaft;

a second pedal coupled to a second end of the inner rotational shaft; and a chain gear that is mechanically coupled to the outer rotational shaft at a fourth coupling location via a fourth coupling structure, wherein the chain gear is configured to rotate about the rotational axis in the rotation direction, and wherein the rotation of the inner rotational shaft causes a rotation of the chain gear via the first coupling structure and the fourth coupling structure.

4. The torque measurement system of embodiment 3, wherein:

the fourth coupling location is spaced apart from the first coupling location in the lateral direction by a third lateral distance, and the second and the third coupling locations are located laterally between the first and the fourth coupling locations.

5. The torque measurement system of embodiment 4, wherein the first lateral distance is greater than the second lateral distance.

6. The torque measurement system of embodiment 3, wherein mechanical power applied to at least one of the first pedal and the second pedal is transferred to the chain gear via a transmission path that propagates from the inner rotational shaft to the first coupling structure to the outer rotational shaft to the fourth coupling structure and to the chain gear.

7. The torque measurement system of embodiment 1, wherein the first electro-magnetic transmit signal interacts with both the first metamaterial track and the second metamaterial track to produce the first electro-magnetic receive signal that depends on the first torque-dependent angular shift. At least one feature (e.g., phase and/or amplitude) of the first electro-magnetic transmit signal changes with angular shift to produce the first electro-magnetic receive signal.

8. The torque measurement system of embodiment 1, wherein:

the first and second metamaterial tracks are separated from the rotational axis in a radial direction that is orthogonal to an axial direction of the rotational axis, and the first metamaterial track is spaced apart from the second first metamaterial track in a lateral direction that is parallel to the axial direction of the rotational axis.

9. The torque measurement system of embodiment 1, further comprising:

a first rotatable carrier structure mechanically coupled to the outer rotational shaft and configured to co-rotate with the outer rotational shaft, wherein the first metamaterial track is coupled to the first rotatable carrier structure; and a second rotatable carrier structure mechanically coupled to the inner rotational shaft and configured to co-rotate with the inner rotational shaft, wherein the second metamaterial track is coupled to the second rotatable carrier structure, wherein the second rotatable carrier structure is spaced apart from the first rotatable carrier structure in an axial direction of the rotational axis.

10. The torque measurement system of embodiment 1, further comprising:

a first pedal coupled to a first end of the inner rotational shaft;

a second pedal coupled to a second end of the inner rotational shaft;

wherein the at least one torque includes a first torque applied to the inner rotational shaft via the first pedal and a second torque applied to the inner rotational shaft via the second pedal. The at least one torque may be a sum or a combination of the first torque and the second torque.

11. The torque measurement system of embodiment 1, wherein the first torque-dependent angular shift affects an mm-wave property of the first mutually coupled structure such that the mm-wave property changes based on the at least one torque applied to the inner rotational shaft.

12. The torque measurement system of embodiment 1, wherein the first torque dependent coupling includes at least one of capacitive near field coupling, inductive near field coupling, waveguide coupling, or far field coupling.

13. The torque measurement system of embodiment 1, wherein:

the first mutually coupled structure is configured to modify the first electro-magnetic transmit signal based on the first torque-dependent angular shift, thereby producing the first electro-magnetic receive signal having a property unique to the at least one torque applied to the inner rotational shaft, and the torque measurement system further comprises at least one processor configured to determine the at least one torque applied to the inner rotational shaft based on the received first electro-magnetic receive signal, wherein the at least one processor is configured to evaluate the property of the received first electro-magnetic receive signal, and determine the at least one torque applied to the inner rotational shaft based on the evaluated property.

14. The torque measurement system of embodiment 1, further comprising:

at least one processor configured to determine the at least one torque applied to the inner rotational shaft based on the received first electro-magnetic receive signal. The at least one torque may be a total torque represented by a sum of the first torque applied by a first pedal and the second torque applied by a second pedal, where the at least one processor is configured to determine the summed torque based on the received first electro-magnetic receive signal. Alternatively, a first portion of the determined at least one torque may be attributed substantially to the first torque and a second portion of the of the determined at least one torque may be attributed nominally to the second torque. Alternatively, the determined at least one torque may be an intermixing of the first torque and the second torque, with a certain known percentage of the measured torque attributed to the first torque and a certain known percentage of the measured torque attributed to the second torque, where the percentages are different. The received first electro-magnetic receive signal may be representative of (e.g., proportional to) the total torque, the first torque, or the second torque. Thus, the at least one processor may be configured to determine the total torque, the first torque, or the second torque based on the received first electro-magnetic receive signal.

15. The torque measurement system of embodiment 14, wherein:

the receiver is configured to demodulate the received first electro-magnetic receive signal to generate a demodulated signal, and the at least one processor is configured to evaluate a property of the demodulated signal using at least one of phase analysis, amplitude analysis, or spectral analysis, and determine the at least one torque applied to the inner rotatable shaft based on the evaluated property.

16. The torque measurement system of embodiment 1, further comprising:

a third metamaterial track mechanically coupled to the outer rotational shaft and configured to co-rotate with the outer rotational shaft, wherein the third metamaterial track is arranged outside of the rotational axis, and wherein the third metamaterial track comprises a third array of elementary structures;

a fourth metamaterial track mechanically coupled to the inner rotational shaft and configured to co-rotate with the inner rotational shaft, wherein the fourth metamaterial track is arranged outside of the rotational axis, and wherein the fourth metamaterial track comprises a fourth array of elementary structures, wherein at least one torque applied to the inner rotational shaft is translated into a second torque-dependent angular shift between the inner rotational shaft and the outer rotational shaft about the rotational axis, wherein the third metamaterial track and the fourth metamaterial track are mutually coupled to each other by a second torque dependent coupling, thereby forming a second mutually coupled structure;

at least one second transmitter configured to transmit a second electro-magnetic transmit signal towards the second mutually coupled structure, wherein the second mutually coupled structure is arranged to convert the second electro-magnetic transmit signal into a second electro-magnetic receive signal based on the second torque-dependent angular shift; and at least one second receiver configured to receive the second electro-magnetic receive signal.

17. The torque measurement system of embodiment 16, wherein:

the first metamaterial track is mechanically coupled to the outer rotational shaft at a second coupling location via a second coupling structure, wherein the second coupling location is spaced apart from the first coupling location in a lateral direction by a first lateral distance, and the second metamaterial track is mechanically coupled to the inner rotational shaft at a third coupling location via a third coupling structure, wherein the third coupling location is spaced apart from the first coupling location in the lateral direction by a second lateral distance that is different from the first lateral distance the third metamaterial track is mechanically coupled to the outer rotational shaft at a fourth coupling location via a fourth coupling structure, wherein the fourth coupling location is spaced apart from the first coupling location in a lateral direction by a third lateral distance that is different from the first and the second lateral distances, and the fourth metamaterial track is mechanically coupled to the inner rotational shaft at a fifth coupling location via a fifth coupling structure, wherein the fifth coupling location is spaced apart from the first coupling location in the lateral direction by a fourth lateral distance that is different from the first, the second, and the third lateral distances.

18. The torque measurement system of embodiment 17, further comprising:

a first pedal coupled to a first end of the inner rotational shaft;

a second pedal coupled to a second end of the inner rotational shaft; and a chain gear that is mechanically coupled to the outer rotational shaft at a sixth coupling location via a sixth coupling structure, wherein the chain gear is configured to rotate about the rotational axis in the rotation direction, and wherein the rotation of the inner rotational shaft causes a rotation of the chain gear via the first coupling structure and the sixth coupling structure.

19. The torque measurement system of embodiment 18, wherein:

the sixth coupling location is spaced apart from the first coupling location in the lateral direction by a fifth lateral distance, the second, the third, the fourth, and the fifth coupling locations are located laterally between the first and the sixth coupling locations, the second and the third coupling locations are more proximate to the first end of the inner rotational shaft than the second end of the inner rotational shaft, and the fourth and the fifth coupling locations are more proximate to the second end of the inner rotational shaft than the first end of the inner rotational shaft.

20. The torque measurement system of embodiment 16, wherein:

the first torque-dependent angular shift affects a first mm-wave property of the first mutually coupled structure such that the first mm-wave property changes based on the at least one torque applied to the inner rotational shaft, and the second torque-dependent angular shift affects a second mm-wave property of the second mutually coupled structure such that the second mm-wave property changes based on the at least one torque applied to the inner rotational shaft.

21. The torque measurement system of embodiment 16, wherein:

the first torque dependent coupling includes at least one of capacitive near field coupling, inductive near field coupling, waveguide coupling, or far field coupling, and the second torque dependent coupling includes at least one of capacitive near field coupling, inductive near field coupling, waveguide coupling, or far field coupling.

22. The torque measurement system of embodiment 16, wherein:

the first mutually coupled structure is configured to modify the first electro-magnetic transmit signal based on the first torque-dependent angular shift, thereby producing the first electro-magnetic receive signal having a first property unique to the at least one torque applied to the inner rotational shaft, the second mutually coupled structure is configured to modify the second electro-magnetic transmit signal based on the second torque-dependent angular shift, thereby producing the second electro-magnetic receive signal having a second property unique to the at least one torque applied to the inner rotational shaft, the torque measurement system further comprises at least one processor configured to determine the at least one torque applied to the inner rotational shaft based on the received first electro-magnetic receive signal and the second electro-magnetic receive signal.

23. The torque measurement system of embodiment 22, wherein the at least one processor is configured to determine the first torque-dependent angular shift based on the first electro-magnetic receive signal, determine the second torque-dependent angular shift based on the second electromagnetic receive signal, and determine the at least one torque applied to the inner rotational shaft based on the first torque-dependent angular shift and the second torque-dependent angular shift.

24. The torque measurement system of embodiment 16 or 23, further comprising:

at least one processor configured to determine the at least one torque applied to the inner rotational shaft based on the received first electro-magnetic receive signal and the received second electro-magnetic receive signal. For example, a first torque may be applied by a first pedal and a second torque may be applied by a second pedal and the received first electro-magnetic receive signal may be representative of (e.g., proportional to) the first torque and the received second electro-magnetic receive signal may be representative of (e.g., proportional to) the second torque. The received first electro-magnetic receive signal may be affected by an intermixing of the first torque and the second torque, where the received first electro-magnetic receive signal is attributed substantially to the first torque, with a certain known percentage of the measured torque attributed to the first torque and a certain known nominal percentage of the measured torque attributed to the second torque, where the percentages are different. In some cases, the exact percentages are not known but the portion of the second torque affecting the first electro-magnetic transmit/receive signal is understood to be nominal and can be ignored for determining the first torque from the first electro-magnetic receive signal. Likewise, the received second electro-magnetic receive signal may be affected by an intermixing of the first torque and the second torque, where the received second electro-magnetic receive signal is attributed substantially to the second torque, with a certain known percentage of the measured torque attributed to the second torque and a certain known nominal percentage of the measured torque attributed to the first torque, where the percentages are different. In some cases, the exact percentages are not known but the portion of the first torque affecting the second electro-magnetic transmit/receive signal is understood to be nominal and can be ignored for determining the second torque from the second electro-magnetic receive signal.

25. The torque measurement system of embodiment 1, further comprising:

a third metamaterial track coupled to the inner rotational shaft or to the outer rotational shaft and configured to co-rotate with the inner rotational shaft or the outer rotational shaft, respectively, wherein the third metamaterial track is arranged at least partially around the rotational axis, and wherein the third metamaterial track comprises a third array of elementary structures, wherein the at least one first transmitter is configured to transmit a second electro-magnetic transmit signal at the third metamaterial track, wherein the third metamaterial track is arranged to convert the second electro-magnetic transmit signal into a second electro-magnetic receive signal, the at least one first receiver is configured to receive the second electro-magnetic receive signal.

26. The torque measurement system of embodiment 25, wherein:

the third metamaterial track is configured to modify the second electro-magnetic transmit signal, thereby producing the second electro-magnetic receive signal having a periodic change proportional to a rotational speed of the inner rotational shaft or the outer rotational shaft, respectively, and the torque measurement system further comprises at least one processor configured to measure the periodic change of the second electro-magnetic receive signal and determine the rotational speed of the inner rotational shaft or the outer rotational shaft based on the periodic change.

27. A torque measurement system, comprising:

an outer hollow rotational shaft having a first interior volume and configured to rotate about a rotational axis in a rotation direction;

an inner hollow rotational shaft having a second interior volume and arranged in the first interior volume, wherein the inner hollow rotational shaft is configured to rotate about the rotational axis in the rotation direction;

a center rotational shaft arranged in the second interior volume and configured to rotate about the rotational axis in the rotation direction, wherein the inner hollow rotational shaft is mechanically coupled to the center rotational shaft at a first coupling location via a first coupling structure, wherein a rotation of the center rotational shaft causes a rotation of the inner hollow rotational shaft via the first coupling structure, wherein the outer hollow rotational shaft is mechanically coupled to the inner hollow rotational shaft at a second coupling location via a second coupling structure, wherein the rotation of the inner hollow rotational shaft causes a rotation of the outer hollow rotational shaft via the second coupling structure, wherein at least one torque applied to the center rotational shaft is translated into a first torque-dependent angular shift between the outer hollow rotational shaft and the inner hollow rotational shaft about the rotational axis;

a first metamaterial track mechanically coupled to the center rotational shaft and the inner hollow rotational shaft via the first coupling structure and configured to co-rotate with the center rotational shaft and the inner hollow rotational shaft, wherein the first metamaterial track is arranged at least partially around the rotational axis, and wherein the first metamaterial track comprises a first array of elementary structures;

a second metamaterial track mechanically coupled to the outer hollow rotational shaft and configured to co-rotate with the outer hollow rotational shaft, wherein the second metamaterial track is arranged at least partially around the rotational axis, and wherein the second metamaterial track comprises a second array of elementary structures, wherein the first metamaterial track and the second metamaterial track are mutually coupled to each other by a first torque dependent coupling, thereby forming a first mutually coupled structure;

at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and at least one first receiver configured to receive the first electro-magnetic receive signal.

28. The torque measurement system of embodiment 27, wherein:

the first coupling location is spaced apart from the second coupling location in a lateral direction by a first lateral distance, and the second metamaterial track is mechanically coupled to the outer hollow rotational shaft at a third coupling location via a third coupling structure, wherein the third coupling location is spaced apart from the second coupling location in the lateral direction by a second lateral distance that is different from the first lateral distance.

29. The torque measurement system of embodiment 28, further comprising:

a first pedal coupled to a first end of the center rotational shaft;

a second pedal coupled to a second end of the center rotational shaft; and a chain gear that is mechanically coupled to the outer hollow rotational shaft at a fourth coupling location via a fourth coupling structure, wherein the chain gear is configured to rotate about the rotational axis in the rotation direction, and wherein the rotation of the center rotational shaft causes a rotation of the chain gear via the first coupling structure and the fourth coupling structure.

30. The torque measurement system of embodiment 29, wherein:

the fourth coupling location is spaced apart from the second coupling location in the lateral direction by a third lateral distance, and the first and the third coupling locations are located laterally between the second and the fourth coupling locations.

31. The torque measurement system of embodiment 30, wherein the first lateral distance is less than the second lateral distance.

32. The torque measurement system of embodiment 29, wherein mechanical power applied to at least one of the first pedal and the second pedal is transferred to the chain gear via a transmission path that propagates from the center rotational shaft to the first coupling structure to the inner hollow rotational shaft to the second coupling structure to the outer hollow rotational shaft to the fourth coupling structure and to the chain gear.

33. The torque measurement system of embodiment 27, wherein:

the second coupling location is spaced apart from the first coupling location in a lateral direction by a first lateral distance, and the second metamaterial track is mechanically coupled to the outer hollow rotational shaft at a third coupling location via a third coupling structure, wherein the third coupling location is spaced apart from the first coupling location in the lateral direction by a second lateral distance that is less than the first lateral distance.

34. The torque measurement system of embodiment 33, further comprising:

a first pedal coupled to a first end of the center rotational shaft;

a second pedal coupled to a second end of the center rotational shaft; and a chain gear that is mechanically coupled to the inner hollow rotational shaft at a fourth coupling location via a fourth coupling structure, wherein the chain gear is configured to rotate about the rotational axis in the rotation direction, and wherein the rotation of the center rotational shaft causes a rotation of the chain gear via the first coupling structure and the fourth coupling structure.

35. The torque measurement system of embodiment 34, wherein mechanical power applied to at least one of the first pedal and the second pedal is transferred to the chain gear via a transmission path that propagates from the center rotational shaft to the first coupling structure to the inner hollow rotational shaft to the fourth coupling structure and to the chain gear.

36. The torque measurement system of embodiment 33, further comprising:

a first pedal coupled to a first end of the center rotational shaft;

a second pedal coupled to a second end of the center rotational shaft; and a chain gear that is mechanically coupled to the center rotational shaft at a fourth coupling location via a freewheel, wherein the chain gear is configured to rotate about the rotational axis in the rotation direction, and wherein the rotation of the center rotational shaft causes a rotation of the chain gear via the first coupling structure and the freewheel.

The metamaterial-based sensor concept described herein is capable of resolving very small shift angles smaller than 10 millidegrees. This allows the system to perform torque measurements with resolution smaller than 5 nm when using a rigid center rotational shaft made of, for example, steel. In order to increase resolution, the center rotational shaft is chosen in a way that it allows twist deformations and thus increases the twist angle per applied newton meter. An elastomer coupling is a possible implementation. Driving dynamics of pedelecs with these dual-sided sensors is lower than in single-sided ones. The advantage is that it is more cost effective and thus suited for pedelecs in the low-price segment.

While various embodiments have been disclosed, it will be apparent to those skilled in the art that various changes and modifications can be made which will achieve some of the advantages of the concepts disclosed herein without departing from the spirit and scope of the invention. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein. Thus, it will be obvious to those reasonably skilled in the art that other components performing the same functions may be suitably substituted Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A torque measurement system, comprising:
an outer rotational shaft configured to rotate about a rotational axis, wherein the outer rotational shaft is a hollow shaft having an interior volume;
an inner rotational shaft arranged in the interior volume of the outer rotational shaft and configured to rotate about the rotational axis,
wherein the outer rotational shaft is mechanically coupled to the inner rotational shaft at a first coupling location via a first coupling structure, wherein a rotation of the inner rotational shaft causes a rotation of the outer rotational shaft via the first coupling structure,
wherein at least one torque applied to the inner rotational shaft is translated into a first torque-dependent angular shift between the inner rotational shaft and the outer rotational shaft about the rotational axis;
a first metamaterial track mechanically coupled to the outer rotational shaft and configured to co-rotate with the outer rotational shaft, wherein the first metamaterial track is arranged at least partially around of the rotational axis, and wherein the first metamaterial track comprises a first array of elementary structures;
a second metamaterial track mechanically coupled to the inner rotational shaft and configured to co-rotate with the inner rotational shaft, wherein the second metamaterial track is arranged at least partially around the rotational axis, and wherein the second metamaterial track comprises a second array of elementary structures,
wherein the first metamaterial track and the second metamaterial track are mutually coupled to each other by a first torque dependent coupling, thereby forming a first mutually coupled structure;
at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and
at least one first receiver configured to receive the first electro-magnetic receive signal.

2. The torque measurement system of claim 1, wherein:
the first metamaterial track is mechanically coupled to the outer rotational shaft at a second coupling location via a second coupling structure, wherein the second coupling location is spaced apart from the first coupling location in a lateral direction by a first lateral distance, and
the second metamaterial track is mechanically coupled to the inner rotational shaft at a third coupling location via a third coupling structure, wherein the third coupling location is spaced apart from the first coupling location in the lateral direction by a second lateral distance that is different from the first lateral distance.

3. The torque measurement system of claim 2, further comprising:
a first pedal coupled to a first end of the inner rotational shaft;
a second pedal coupled to a second end of the inner rotational shaft; and
a chain gear that is mechanically coupled to the outer rotational shaft at a fourth coupling location via a fourth coupling structure, wherein the chain gear is configured to rotate about the rotational axis in the rotation direction, and wherein the rotation of the inner rotational shaft causes a rotation of the chain gear via the first coupling structure and the fourth coupling structure.

4. The torque measurement system of claim 3, wherein:
the fourth coupling location is spaced apart from the first coupling location in the lateral direction by a third lateral distance, and
the second and the third coupling locations are located laterally between the first and the fourth coupling locations.

5. The torque measurement system of claim 3, wherein mechanical power applied to at least one of the first pedal and the second pedal is transferred to the chain gear via a transmission path that propagates from the inner rotational shaft to the first coupling structure to the outer rotational shaft to the fourth coupling structure and to the chain gear.

6. The torque measurement system of claim 1, wherein the first electro-magnetic transmit signal interacts with both the first metamaterial track and the second metamaterial track to produce the first electro-magnetic receive signal that depends on the first torque-dependent angular shift.

7. The torque measurement system of claim 1, wherein:
the first and second metamaterial tracks are separated from the rotational axis in a radial direction that is orthogonal to an axial direction of the rotational axis, and
the first metamaterial track is spaced apart from the second metamaterial track in a lateral direction that is parallel to the axial direction of the rotational axis.

8. The torque measurement system of claim 1, further comprising:
a first rotatable carrier structure mechanically coupled to the outer rotational shaft and configured to co-rotate with the outer rotational shaft, wherein the first metamaterial track is coupled to the first rotatable carrier structure; and
a second rotatable carrier structure mechanically coupled to the inner rotational shaft and configured to co-rotate with the inner rotational shaft, wherein the second metamaterial track is coupled to the second rotatable carrier structure, wherein the second rotatable carrier structure is spaced apart from the first rotatable carrier structure in an axial direction of the rotational axis.

9. The torque measurement system of claim 1, further comprising:
a first pedal coupled to a first end of the inner rotational shaft;

a second pedal coupled to a second end of the inner rotational shaft;

wherein the at least one torque includes a first torque applied to the inner rotational shaft via the first pedal and a second torque applied to the inner rotational shaft via the second pedal.

10. The torque measurement system of claim 1, wherein the first torque-dependent angular shift affects an mm-wave property of the first mutually coupled structure such that the mm-wave property changes based on the at least one torque applied to the inner rotational shaft.

11. The torque measurement system of claim 1, wherein the first torque dependent coupling includes at least one of capacitive near field coupling, inductive near field coupling, waveguide coupling, or far field coupling.

12. The torque measurement system of claim 1, wherein:
the first mutually coupled structure is configured to modify the first electro-magnetic transmit signal based on the first torque-dependent angular shift, thereby producing the first electro-magnetic receive signal having a property unique to the at least one torque applied to the inner rotational shaft, and
the torque measurement system further comprises at least one processor configured to determine the at least one torque applied to the inner rotational shaft based on the received first electro-magnetic receive signal,
wherein the at least one processor is configured to evaluate the property of the received first electro-magnetic receive signal, and determine the at least one torque applied to the inner rotational shaft based on the evaluated property.

13. The torque measurement system of claim 1, further comprising:
at least one processor configured to determine the at least one torque applied to the inner rotational shaft based on the received first electro-magnetic receive signal.

14. The torque measurement system of claim 13, wherein:
the receiver is configured to demodulate the received first electro-magnetic receive signal to generate a demodulated signal, and
the at least one processor is configured to evaluate a property of the demodulated signal using at least one of phase analysis, amplitude analysis, or spectral analysis, and determine the at least one torque applied to the inner rotatable shaft based on the evaluated property.

15. The torque measurement system of claim 1, further comprising:
a third metamaterial track mechanically coupled to the outer rotational shaft and configured to co-rotate with the outer rotational shaft, wherein the third metamaterial track is arranged outside of the rotational axis, and wherein the third metamaterial track comprises a third array of elementary structures;
a fourth metamaterial track mechanically coupled to the inner rotational shaft and configured to co-rotate with the inner rotational shaft, wherein the fourth metamaterial track is arranged outside of the rotational axis, and wherein the fourth metamaterial track comprises a fourth array of elementary structures,
wherein at least one torque applied to the inner rotational shaft is translated into a second torque-dependent angular shift between the inner rotational shaft and the outer rotational shaft about the rotational axis,
wherein the third metamaterial track and the fourth metamaterial track are mutually coupled to each other by a second torque dependent coupling, thereby forming a second mutually coupled structure;

at least one second transmitter configured to transmit a second electro-magnetic transmit signal towards the second mutually coupled structure, wherein the second mutually coupled structure is arranged to convert the second electro-magnetic transmit signal into a second electro-magnetic receive signal based on the second torque-dependent angular shift; and
at least one second receiver configured to receive the second electro-magnetic receive signal.

16. The torque measurement system of claim 15, wherein:
the first metamaterial track is mechanically coupled to the outer rotational shaft at a second coupling location via a second coupling structure, wherein the second coupling location is spaced apart from the first coupling location in a lateral direction by a first lateral distance, and
the second metamaterial track is mechanically coupled to the inner rotational shaft at a third coupling location via a third coupling structure, wherein the third coupling location is spaced apart from the first coupling location in the lateral direction by a second lateral distance that is different from the first lateral distance
the third metamaterial track is mechanically coupled to the outer rotational shaft at a fourth coupling location via a fourth coupling structure, wherein the fourth coupling location is spaced apart from the first coupling location in a lateral direction by a third lateral distance that is different from the first and the second lateral distances, and
the fourth metamaterial track is mechanically coupled to the inner rotational shaft at a fifth coupling location via a fifth coupling structure, wherein the fifth coupling location is spaced apart from the first coupling location in the lateral direction by a fourth lateral distance that is different from the first, the second, and the third lateral distances.

17. The torque measurement system of claim 16, further comprising:
a first pedal coupled to a first end of the inner rotational shaft;
a second pedal coupled to a second end of the inner rotational shaft; and
a chain gear that is mechanically coupled to the outer rotational shaft at a sixth coupling location via a sixth coupling structure, wherein the chain gear is configured to rotate about the rotational axis in the rotation direction, and wherein the rotation of the inner rotational shaft causes a rotation of the chain gear via the first coupling structure and the sixth coupling structure.

18. The torque measurement system of claim 17, wherein:
the sixth coupling location is spaced apart from the first coupling location in the lateral direction by a fifth lateral distance,
the second, the third, the fourth, and the fifth coupling locations are located laterally between the first and the sixth coupling locations,
the second and the third coupling locations are more proximate to the first end of the inner rotational shaft than the second end of the inner rotational shaft, and
the fourth and the fifth coupling locations are more proximate to the second end of the inner rotational shaft than the first end of the inner rotational shaft.

19. The torque measurement system of claim 15, wherein:
the first torque-dependent angular shift affects a first mm-wave property of the first mutually coupled structure such that the first mm-wave property changes based on the at least one torque applied to the inner rotational shaft, and the second torque-dependent angular shift affects a second mm-wave property of the second mutually coupled structure such that the second mm-wave property changes based on the at least one torque applied to the inner rotational shaft.

20. The torque measurement system of claim 15, wherein:
the first torque dependent coupling includes at least one of capacitive near field coupling, inductive near field coupling, waveguide coupling, or far field coupling, and the second torque dependent coupling includes at least one of capacitive near field coupling, inductive near field coupling, waveguide coupling, or far field coupling.

21. The torque measurement system of claim 15, wherein:
the first mutually coupled structure is configured to modify the first electro-magnetic transmit signal based on the first torque-dependent angular shift, thereby producing the first electro-magnetic receive signal having a first property unique to the at least one torque applied to the inner rotational shaft, the second mutually coupled structure is configured to modify the second electro-magnetic transmit signal based on the second torque-dependent angular shift, thereby producing the second electro-magnetic receive signal having a second property unique to the at least one torque applied to the inner rotational shaft, the torque measurement system further comprises at least one processor configured to determine the at least one torque applied to the inner rotational shaft based on the received first electro-magnetic receive signal and the second electro-magnetic receive signal.

22. The torque measurement system of claim 21, wherein the at least one processor is configured to determine the first torque-dependent angular shift based on the first electro-magnetic receive signal, determine the second torque-dependent angular shift based on the second electro-magnetic receive signal, and determine the at least one torque applied to the inner rotational shaft based on the first torque-dependent angular shift and the second torque-dependent angular shift.

23. The torque measurement system of claim 15, further comprising:
at least one processor configured to determine the at least one torque applied to the inner rotational shaft based on the received first electro-magnetic receive signal and the received second electro-magnetic receive signal.

24. The torque measurement system of claim 1, further comprising:
a third metamaterial track coupled to the inner rotational shaft or to the outer rotational shaft and configured to co-rotate with the inner rotational shaft or the outer rotational shaft, respectively, wherein the third metamaterial track is arranged at least partially around the rotational axis, and wherein the third metamaterial track comprises a third array of elementary structures, wherein the at least one first transmitter is configured to transmit a second electro-magnetic transmit signal at the third metamaterial track, wherein the third metamaterial track is arranged to convert the second electro-magnetic transmit signal into a second electro-magnetic receive signal, the at least one first receiver is configured to receive the second electro-magnetic receive signal.

25. The torque measurement system of claim 24, wherein:
the third metamaterial track is configured to modify the second electro-magnetic transmit signal, thereby producing the second electro-magnetic receive signal having a periodic change proportional to a rotational speed of the inner rotational shaft or the outer rotational shaft, respectively, and the torque measurement system further comprises at least one processor configured to measure the periodic change of the second electro-magnetic receive signal and determine the rotational speed of the inner rotational shaft or the outer rotational shaft based on the periodic change.

26. A torque measurement system, comprising:
an outer hollow rotational shaft having a first interior volume and configured to rotate about a rotational axis in a rotation direction;

an inner hollow rotational shaft having a second interior volume and arranged in the first interior volume, wherein the inner hollow rotational shaft is configured to rotate about the rotational axis in the rotation direction;

a center rotational shaft arranged in the second interior volume and configured to rotate about the rotational axis in the rotation direction, wherein the inner hollow rotational shaft is mechanically coupled to the center rotational shaft at a first coupling location via a first coupling structure, wherein a rotation of the center rotational shaft causes a rotation of the inner hollow rotational shaft via the first coupling structure, wherein the outer hollow rotational shaft is mechanically coupled to the inner hollow rotational shaft at a second coupling location via a second coupling structure, wherein the rotation of the inner hollow rotational shaft causes a rotation of the outer hollow rotational shaft via the second coupling structure, wherein at least one torque applied to the center rotational shaft is translated into a first torque-dependent angular shift between the outer hollow rotational shaft and the inner hollow rotational shaft about the rotational axis;

a first metamaterial track mechanically coupled to the center rotational shaft and the inner hollow rotational shaft via the first coupling structure and configured to co-rotate with the center rotational shaft and the inner hollow rotational shaft, wherein the first metamaterial track is arranged at least partially around the rotational axis, and wherein the first metamaterial track comprises a first array of elementary structures;

a second metamaterial track mechanically coupled to the outer hollow rotational shaft and configured to co-rotate with the outer hollow rotational shaft, wherein the second metamaterial track is arranged at least partially around the rotational axis, and wherein the second metamaterial track comprises a second array of elementary structures, wherein the first metamaterial track and the second metamaterial track are mutually coupled to each other by a first torque dependent coupling, thereby forming a first mutually coupled structure;

at least one first transmitter configured to transmit a first electro-magnetic transmit signal towards the first mutually coupled structure, wherein the first mutually coupled structure is arranged to convert the first electro-magnetic transmit signal into a first electro-magnetic receive signal based on the first torque-dependent angular shift; and at least one first receiver configured to receive the first electro-magnetic receive signal.

\* \* \* \* \*